United States Patent [19]
Shirasaki

[11] Patent Number: 5,973,838
[45] Date of Patent: Oct. 26, 1999

[54] APPARATUS WHICH INCLUDES A VIRTUALLY IMAGED PHASED ARRAY (VIPA) IN COMBINATION WITH A WAVELENGTH SPLITTER TO DEMULTIPLEX WAVELENGTH DIVISION MULTIPLEXED (WDM) LIGHT

[75] Inventor: Masataka Shirasaki, Winchester, Mass.

[73] Assignee: Fujitsu Limited, Kawasaki, Japan

[21] Appl. No.: 08/948,945

[22] Filed: Oct. 10, 1997

Related U.S. Application Data

[63] Continuation-in-part of application No. 08/685,362, Jul. 24, 1996.

[30] Foreign Application Priority Data

Jul. 26, 1995 [JP] Japan ..................................... 7-190535

[51] Int. Cl.$^6$ .............................. G02B 5/04; G02B 27/00
[52] U.S. Cl. ......................... 359/577; 359/615; 359/629; 359/839
[58] Field of Search ..................................... 359/130, 566, 359/568, 571, 615, 577, 629, 839, 857, 861; 385/37

[56] References Cited

U.S. PATENT DOCUMENTS

| | | | |
|---|---|---|---|
| 2,534,846 | 12/1950 | Ambrose et al. | 359/577 |
| 3,647,285 | 3/1972 | Harvey et al. | 359/577 |
| 3,832,030 | 8/1974 | Gloge | 385/33 |
| 4,257,673 | 3/1981 | Matthijsse | 385/37 |

(List continued on next page.)

FOREIGN PATENT DOCUMENTS

| | | | |
|---|---|---|---|
| 0026669 | 5/1930 | Australia | 359/578 |
| 0031027 | 7/1981 | European Pat. Off. | 385/37 |
| 61-121011 | 6/1986 | Japan | 385/37 |
| 62-264009 | 11/1987 | Japan | 385/37 |
| 1-280706 | 11/1989 | Japan | 385/37 |

OTHER PUBLICATIONS

M. Shirasaki, Large Angular–Dispersion By Virtually–Imaged Phased–Array (VIPA) and Its Application to Wavelength Demultiplexing, MOC '95, Hiroshima, Oct. 1995.

M. Shirasaki, Large Angular Dispersion by a Virtually–Imaged Phased Array and its Application to a Wavelength Demultimplexer, Optics Letters, vol. 21, No. 5, Mar. 1996.888

M. Shirasaki, Temperature Independent Interferometer For WDM Filters, Paper WeD.1.6 ECOC '96 (European Conference on Optical Communication), Sep. 18, 1996.

(List continued on next page.)

*Primary Examiner*—Cassandra Spyrou
*Assistant Examiner*—John Juba, Jr.
*Attorney, Agent, or Firm*—Staas &Halsey

[57] ABSTRACT

An apparatus which combines a virtually imaged phased array (VIPA) with a demultiplexer, to provide a large bandwidth, high resolution wavelength demultiplexer. Generally, a VIPA is a device which receives an input light having a respective wavelength within a continuous range of wavelengths, and causes multiple reflection of the input light to produce self-interference and thereby form an output light. The output light is spatially distinguishable from an output light formed for an input light having any other wavelength within the continuous range of wavelengths. The apparatus combines the VIPA with a demultiplexer, such as a diffraction grating. More specifically, the VIPA receives an input light and produces a corresponding output light propagating away from the VIPA. The output light includes a plurality of different wavelength components. The demultiplexer demultiplexes the output light into a plurality of separated lights corresponding, respectively, to the plurality of different wavelength components in the output light. Preferably, the demultiplexer has a dispersion direction which is substantially perpendicular to the dispersion direction of the VIPA. In this case, the separated lights from the demultiplexer can be detected with fibers arranged in a grid pattern.

44 Claims, 16 Drawing Sheets

U.S. PATENT DOCUMENTS

| | | | |
|---|---|---|---|
| 4,362,361 | 12/1982 | Campbell et al. | 359/629 |
| 4,655,547 | 4/1987 | Heritage et al. | 359/563 |
| 4,820,019 | 4/1989 | Yoshida et al. | 359/578 |
| 5,071,225 | 12/1991 | Inoue | 359/589 |
| 5,119,454 | 6/1992 | McMahon | 385/49 |
| 5,166,818 | 11/1992 | Chase et al. | 359/615 |
| 5,309,456 | 5/1994 | Horton | 372/25 |
| 5,583,683 | 12/1996 | Scobey | 359/127 |
| 5,666,195 | 9/1997 | Shultz et al. | 356/352 |
| 5,715,095 | 2/1998 | Hiratsuka et al. | 359/634 |
| 5,786,915 | 7/1998 | Scobey | 359/127 |

OTHER PUBLICATIONS

M. Shirasaki, Filtering Characteristics of Virtually–Imaged Phased Array, Presented at IPR (Integrated Photonics Research) Topical Meeting Paper IMC3, Apr. 29, 1996, Boston, MA.

W. H. Fincham & M. H. Freeman, Optics, Ninth ed., Butterworth (Publishers), Inc., Boston §§ 14.7 & 14.14, Jan. 1980.

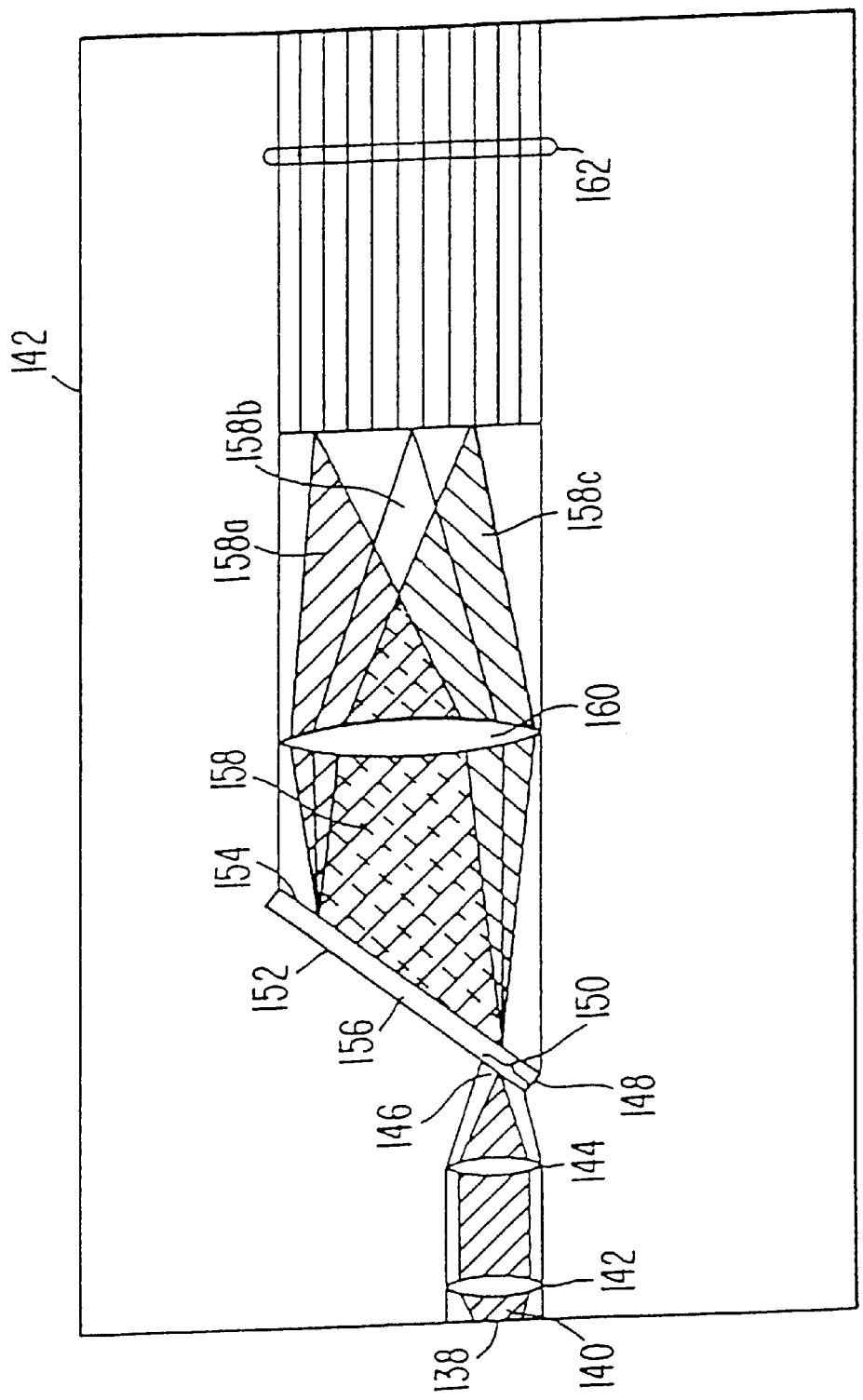

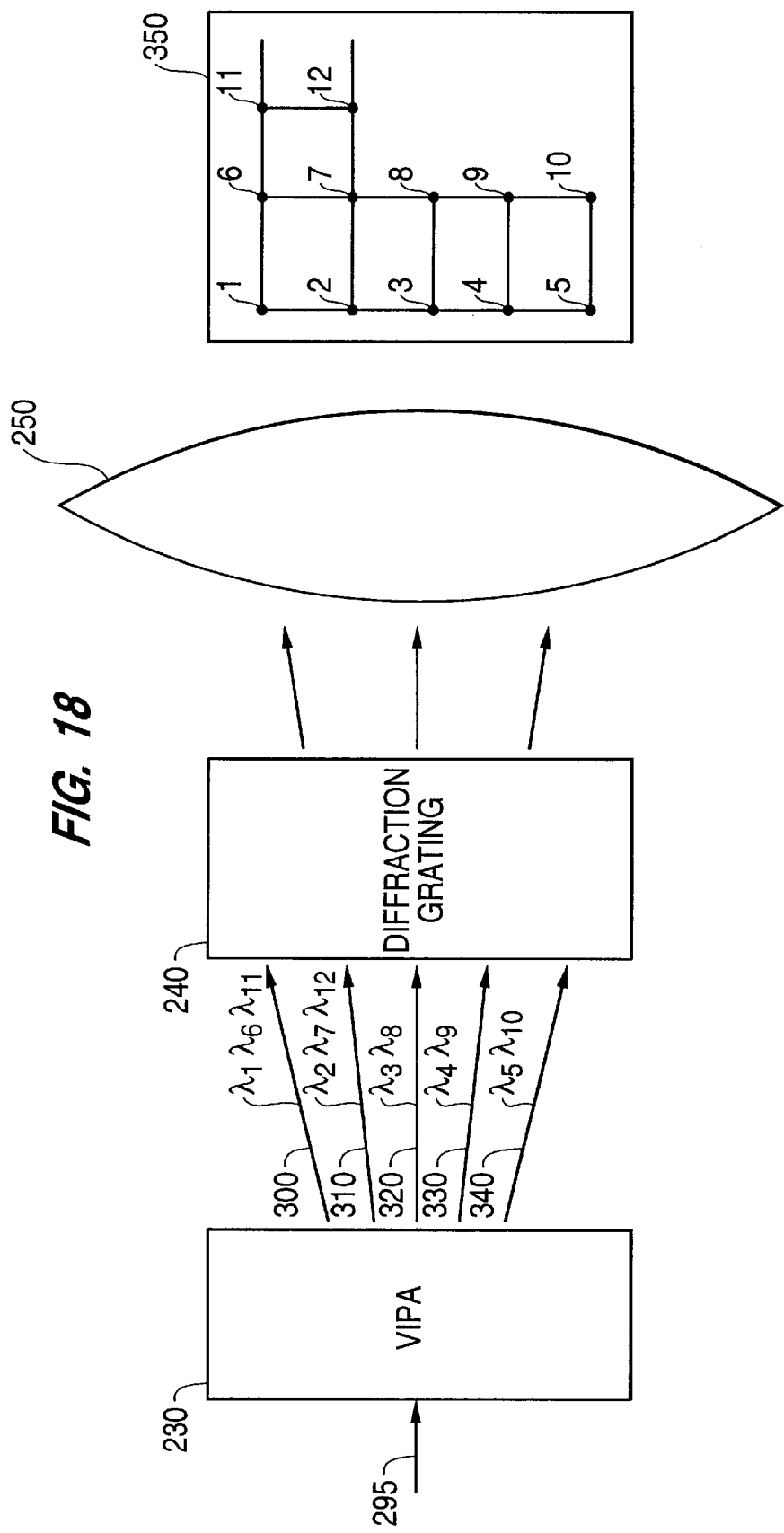

APPARATUS WHICH INCLUDES A VIRTUALLY IMAGED PHASED ARRAY (VIPA) IN COMBINATION WITH A WAVELENGTH SPLITTER TO DEMULTIPLEX WAVELENGTH DIVISION MULTIPLEXED (WDM) LIGHT

CROSS-REFERENCE TO RELATED APPLICATIONS

This application is based on, and claims priority to, Japanese patent application number 07-190535, filed Jul. 26, 1995, in Japan, and which is incorporated herein by reference.

This application is a continuation-in-part (CIP) of U.S. application titled VIRTUALLY IMAGED PHASED ARRAY AS A WAVELENGTH DEMULTIPLEXER, U.S. Ser. No. 08/685,362, filed Jul. 24, 1996, still pending and which is incorporated herein by reference.

This application is related to U.S. application titled OPTICAL APPARATUS WHICH USES A VIRTUALLY IMAGED PHASED ARRAY TO PRODUCE CHROMATIC DISPERSION, U.S. Ser. No. 08/796,842, filed Feb. 7, 1997, which is incorporated herein by reference.

This application is related to U.S. application titled OPTICAL APPARATUS WHICH USES A VIRTUALLY IMAGED PHASED ARRAY TO PRODUCE CHROMATIC DISPERSION, U.S. Ser. No. 08/910,251, filed Aug. 13, 1997, which is incorporated herein by reference.

BACKGROUND OF THE INVENTION

1. Field of the Invention

The present invention relates to an apparatus which includes a virtually imaged phased array (VIPA) to demultiplex a wavelength division multiplexed (WDM) light. More specifically, the present invention relates to an apparatus which includes a VIPA in combination with a wavelength splitter, such as a diffraction grating, to allow a wavelength division multiplexed light having a relatively large number of closely spaced wavelength components to be accurately demultiplexed.

2. Description of the Related Art

Wavelength division multiplexing is used in fiber optic communication systems to transfer a relatively large amount of data at a high speed. More specifically, a plurality of carriers, each modulated with information, is combined into a wavelength division multiplexed light. The wavelength division multiplexed light is then transmitted through a single optical fiber to a receiver. The receiver splits the wavelength division multiplexed light into the individual carriers, so that the individual carriers can be detected. In this manner, a communication system can transfer a relatively large amount of data over an optical fiber.

Therefore, the ability of the receiver to accurately split the wavelength division multiplexed light will greatly effect the performance of the communication system. For example, even if a large number of carriers can be combined into a wavelength division multiplexed light, such a wavelength division multiplexed light should not be transmitted if the receiver cannot accurately split the wavelength division multiplexed light. Accordingly, it is desirable for a receiver to include a high-precision wavelength splitter.

FIG. 1 is a diagram illustrating a conventional filter using a multiple-layer interference film, for use as a wavelength splitter. Referring now to FIG. 1, a multiple-layer interference film 20 is formed on a transparent substrate 22. Light 24, which must be parallel light, is incident on film 20 and then repeatedly reflected in film 20. Optical conditions determined by the characteristics of film 20 allow only a light 26 having wavelength λ2 to pass therethrough. A light 28, which includes all light not meeting the optical conditions, does not pass through the film 20 and is reflected. Thus, a filter as illustrated in FIG. 1 is useful for splitting a wavelength division multiplexed light which includes only two carriers at different wavelengths, λ1 and λ2. Unfortunately, such a filter, by itself, cannot separate a wavelength division multiplexed light having more than two carriers.

FIG. 2 is a diagram illustrating a conventional Fabry-Perot interferometer for use as a wavelength splitter. Referring now to FIG. 2, high-reflectance reflecting films and 32 are parallel to each other. Light 34, which must be parallel light, is incident on reflecting film 30 and reflected many times between reflecting films 30 and 32. Light 36 of wavelength λ2 that meets passage conditions determined by the characteristics of the Fabry-Perot interferometer passes through reflecting film 32. Light 38 of wavelength λ1, which does not meet the passage conditions, is reflected. In this manner, light having two different wavelengths can be split into two different lights corresponding, respectively, to the two different wavelengths. Thus, as with the filter illustrated in FIG. 1, a conventional Fabry-Perot interferometer is useful for splitting a wavelength division multiplexed light which includes only two carriers at different wavelengths, λ1 and λ2. Unfortunately, such a Fabry-Perot interferometer cannot separate a wavelength division multiplexed light having more than two carriers.

FIG. 3 is a diagram illustrating a conventional Michelson interferometer for use as a wavelength splitter. Referring now to FIG. 3, parallel light 40 is incident on a half mirror 42 and split into a first light 44 and a second light 46 perpendicular to each other. A reflecting mirror 48 reflects first light 44 and a reflecting mirror 50 reflects second light 46. The distance between half mirror 42 and reflecting mirror 48, and the distance between half mirror 42 and reflecting mirror 50 indicate an optical path difference. Light reflected by reflecting mirror 48 is returned to half mirror 42 and interferes with light reflected by reflecting mirror 50 and returned to half mirror 42. As a result, lights 52 and 54 having wavelengths λ1 and λ2, respectively, are separated from each other. As with the filter illustrated in FIG. 1 and the Fabry-Perot interferometer illustrated in FIG. 2, the Michelson interferometer illustrated in FIG. 3 is useful for splitting a wavelength division multiplexed light which includes only two carriers at different wavelengths, λ1 and λ2. Unfortunately, such a Michelson interferometer cannot separate a wavelength division multiplexed light having more than two carriers.

It is possible to combine several filters, Fabry-Perot interferometers or Michelson interferometers into a giant array so that additional wavelength carriers can be split from a single wavelength division multiplexed light. However, such an array is expensive, inefficient and creates an undesireably large receiver.

A diffraction grating or an array waveguide grating is often used to split a wavelength division multiplexed light comprising two or more different wavelength carriers.

FIG. 4 is a diagram illustrating a conventional diffraction grating for splitting a wavelength division multiplexed light. Referring now to FIG. 4, a diffraction grating 56 has a grating surface 58. Parallel light 60 having a plurality of different wavelength carriers is incident on grating surface 58. The different wavelength carriers are reflected at each step of grating surface 58 and interfere with each other. As a result, carriers 62, 64 and 66 having different wavelengths are output from diffraction grating 56 at different angles, and are therefore separated from each.

Unfortunately, a diffraction grating outputs the different wavelength carriers at relatively small dispersion angles. As a result, it is difficult for a receiver to accurately receive the various carrier signals split by the diffraction grating. This problem is especially severe with a diffraction grating which splits a wavelength division multiplexed light having a large number of carriers with relatively close wavelengths. In this case, the angular dispersion produced by the diffraction grating will be extremely small, and typically ≈0.05 degree/nm.

In addition, a diffraction grating is influenced by the optical polarization of the incident light. Therefore, the polarization of the incident light can affect the performance of the diffraction grating. Also, the grating surface of a diffraction grating requires complex manufacturing processes to produce an accurate diffraction grating.

FIG. 5 is a diagram illustrating a conventional array waveguide grating for splitting a wavelength division multiplexed light. Referring now to FIG. 5, light comprising a plurality of different wavelength carriers is received through an entrance 68 and is divided through a number of waveguides 70. An optical exit 72 is at the end of each waveguide 70, so that an output light 74 is produced. Waveguides 70 are different in length from each other, and therefore provide optical paths of different lengths. Therefore, lights passing through waveguides 70 have different phase from each other and thereby interfere each other when they are output through exit 72. This interference causes lights having different wavelengths to be output in different directions.

In an array waveguide grating, the dispersion angle can be adjusted to some extent by properly configuring the waveguides. However, an array waveguide grating is influenced by temperature changes and other environmental factors. Therefore, temperature changes and environmental factors make it difficult to properly adjust the dispersion angle.

SUMMARY OF THE INVENTION

Accordingly, it is an object of the present invention to provide a wavelength splitter having a simple configuration and being capable of simultaneously separating a plurality of carriers from a wavelength division multiplexed light.

It is an additional object of the present invention to provide an apparatus which allows a wavelength division multiplexed light having a relatively large number of closely spaced carriers, or wavelength components, to be accurately demultiplexed.

Objects of the present invention are achieved by providing an apparatus which receives an input light having a respective wavelength within a continuous range of wavelengths and produces a corresponding output light. The output light is spatially distinguishable (for example, it travels in a different direction) from an output light formed for an input light having any other wavelength within the continuous range of wavelengths.

More specifically, the apparatus receives an input light having a respective wavelength within a continuous range of wavelengths, wherein the apparatus causes multiple reflection of the input light to produce self-interference and thereby form an output light. The output light is spatially distinguishable from an output light formed for an input light having any other wavelength within the continuous range of wavelengths. This apparatus may be referred to as a virtually imaged phased array (VIPA).

Moreover, objects of the present invention are achieved by providing an apparatus which combines a VIPA with a wavelength splitter, or "demultiplexer", such as a diffraction grating. More specifically, the VIPA receives an input light and produces a corresponding output light propagating away from the VIPA. The output light includes a plurality of different wavelength components, such as different carriers. The demultiplexer demultiplexes the output light into a plurality of separated lights corresponding, respectively, to the plurality of different wavelength components in the output light. Preferably, the demultiplexer has a dispersion direction which is substantially perpendicular to the dispersion direction of the VIPA. In this case, the separated lights from the demultiplexer can be detected with fibers arranged in a grid pattern.

Further, objects of the present invention are achieved by providing an apparatus which demultiplexes an input light that includes a plurality of lights. The plurality of lights are each at a different wavelength. The apparatus includes first and second demultiplexers. The first demultiplexer demultiplexes the input light into a plurality of output lights corresponding, respectively, to the plurality of lights in the input light. The first demultiplexer disperses the plurality of output lights along a substantially linear dispersion direction at a different output angle for each output light. Moreover, each output light includes a plurality of wavelength components. The second demultiplexer demultiplexes each output light into a plurality of separated lights corresponding, respectively, to the plurality of wavelength components in the output light. The second demultiplexer disperses the plurality of separated lights along a substantially linear dispersion direction at a different output angle for each separated light. The dispersion direction of the second demultiplexer is not parallel to, and is preferably perpendicular to, the dispersion direction of the first demultiplexer.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 14 is a diagram illustrating a waveguide type VIPA, according to an embodiment of the present invention.

FIG. 18 is a diagram illustrating an example of the operation of a VIPA-diffraction apparatus, according to an embodiment of the present invention.

DESCRIPTION OF THE PREFERRED EMBODIMENTS

Figure 1:
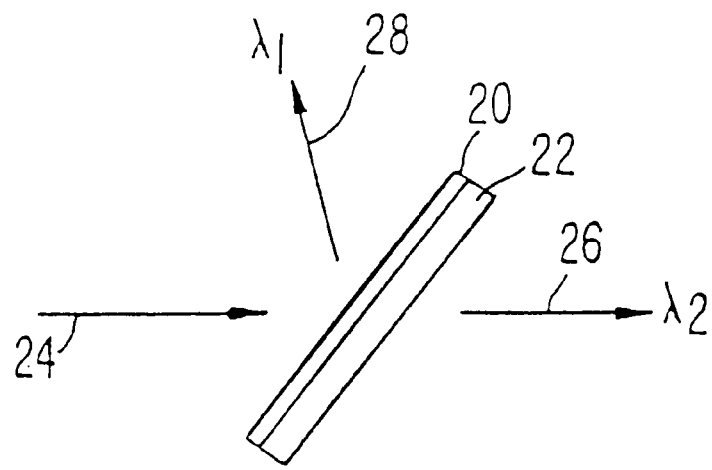
FIG. 1 (prior art) is a diagram illustrating a conventional filter using a multiple-layer interference film.

Reference will now be made in detail to the present preferred embodiments of the present invention, examples of which are illustrated in the accompanying drawings, wherein like reference numerals refer to like elements throughout.

Figure 6:
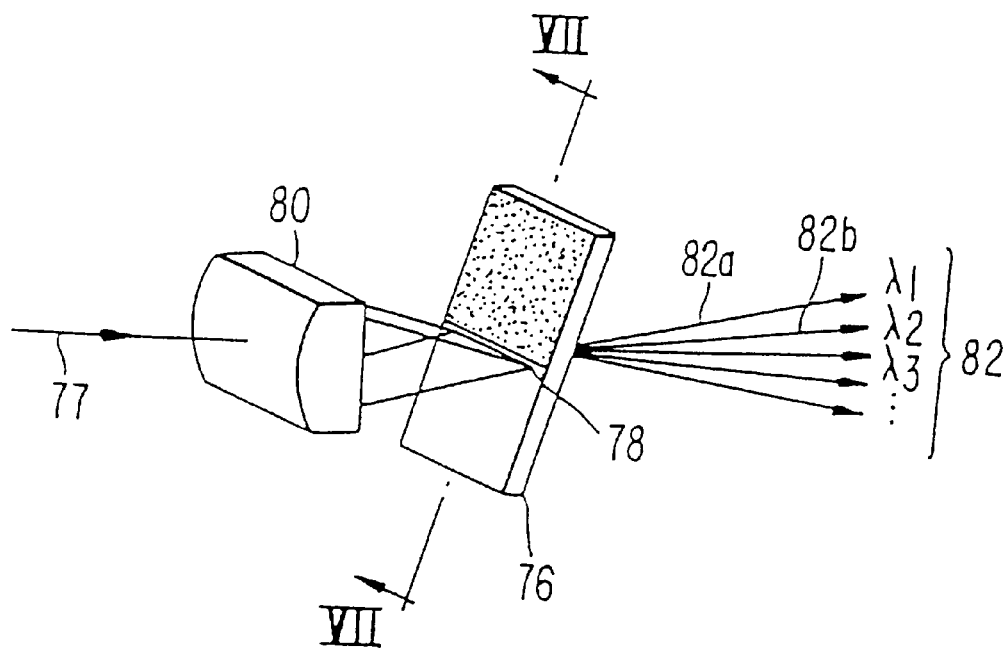
FIG. 6 is a diagram illustrating a virtually imaged phased array (VIPA), according to an embodiment of the present invention.

FIG. 6 is a diagram illustrating a virtually imaged phased array (VIPA), according to an embodiment of the present invention. Hereinafter, the terms "wavelength splitter" and "virtually imaged phased array", or "VIPA", may be used interchangeably.

Referring now to FIG. 6, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 to be received inside VIPA 76. VIPA 78 then outputs a luminous flux 82 of collimated light, where the output angle of luminous flux 82 varies as the wavelength of input light 77 changes. For example, when input light 77 is at a wavelength λ1, VIPA 76 outputs a luminous flux 82a at wavelength λ1 in a specific direction. When input light 77 is at a wavelength λ2, VIPA 76 outputs a luminous flux 82b at wavelength λ2 in a different direction. If input light 77 is a wavelength division multiplexed light which combines light at wavelength λ1 and light at wavelength λ1, then VIPA 76 simultaneously outputs two separate luminous fluxes 82a and 82b in different directions. Therefore, VIPA 76 produces luminous fluxes 82a and 82b which are spatially distinguishable from each other. In this manner, VIPA 76 can simultaneously separate two or more different carrier lights from a wavelength division multiplexed light.

Figure 7:
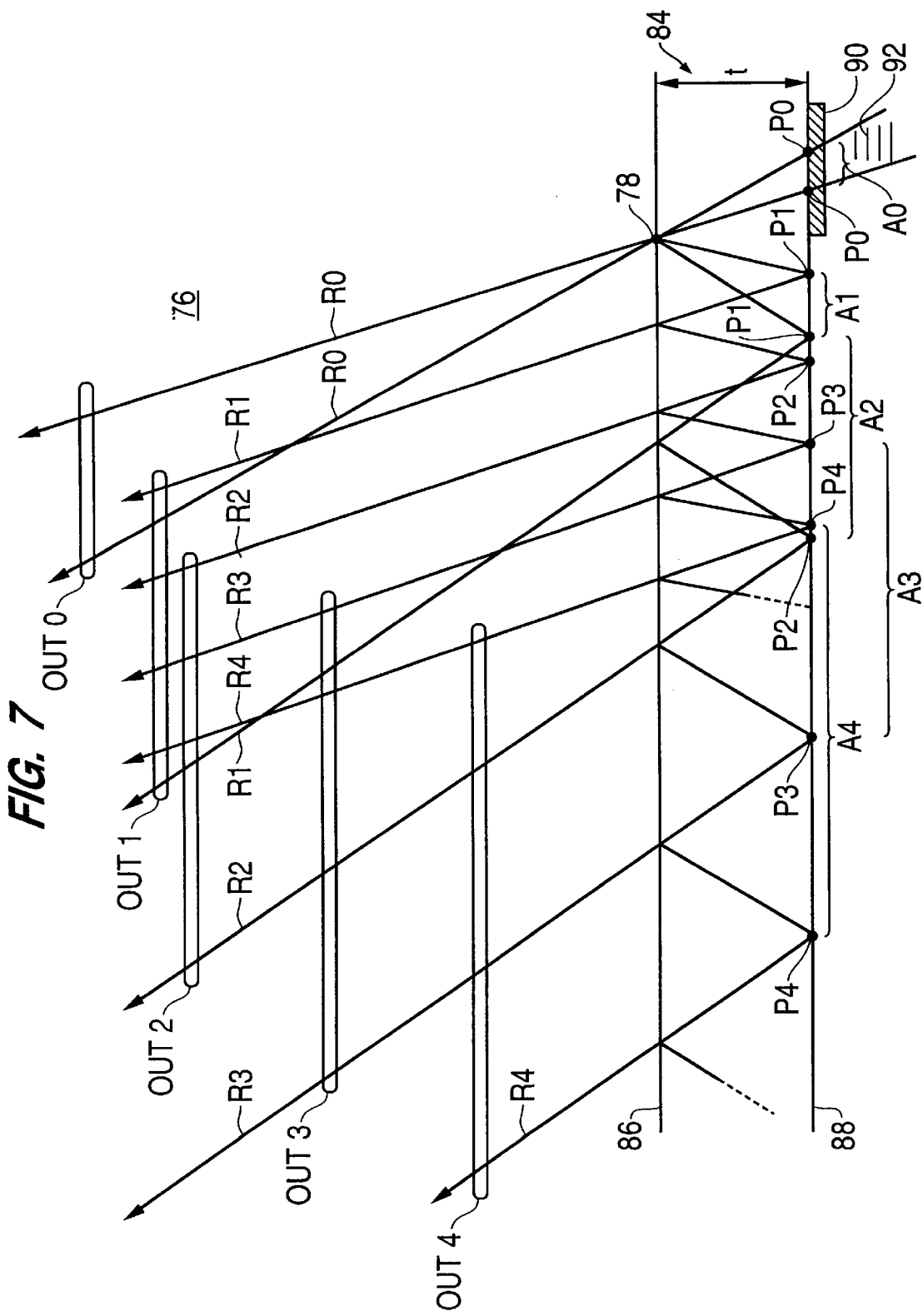
FIG. 7 is a diagram illustrating a cross-section along lines VII—VII of the VIPA illustrated in FIG. 6, according to embodiment of the present invention.

FIG. 7 is a diagram illustrating a cross-section along lines VII—VII of VIPA 76 illustrated in FIG. 6, according to embodiment of the present invention. Referring now to FIG. 7, VIPA 76 comprises a material 84, such as glass, having reflecting surfaces 86 and 88 thereon. Reflecting surfaces 86 and 88 are in parallel with each other and spaced by an interval t. Reflecting surfaces 86 and 88 are typically reflecting films deposited on material 84. Reflecting surface 88 has a reflectance of approximately 100%, except, as described in more detail below, in a radiation window 90. Reflecting surface 86 has a reflectance of approximately 95%. Therefore, reflecting surface 86 has a transmittance of approximately 5% so that approximately 5% of light incident on reflecting surface 86 will be transmitted therethrough and approximately 95% of the light will be reflected. The reflectances can be easily changed in accordance with the specific VIPA application. However, generally, reflecting surface 86 should have a reflectance which is less than 100% so that a portion of incident light can be transmitted therethrough.

Reflecting surface 88 has a radiation window 90 thereon. Radiation window 90 allows light to pass therethrough, and preferably has no reflectance, or a very low reflectance. Radiation window 90 receives input light 92 so that input light 92 can be received between, and reflected between, reflecting surfaces 86 and 88.

Since FIG. 7 represents a cross-section along lines VII—VII of FIG. 6, focal line 78 in FIG. 6 appears as a "point" in FIG. 7. Input light 92 then propagates radially from focal line 78. Moreover, as illustrated in FIG. 7, focal line 78 is positioned on reflecting surface 86. Although it is not required for focal line 78 to be on reflecting surface 86, a shift in the positioning of focal line 78 may cause small changes in the characteristics of VIPA 76.

As illustrated in FIG. 7, input light 92 enters material 84 through an area A0 in radiation window 90, where points P0 indicate peripheral points of area A0.

Due to the reflectivity of reflecting surface 86, approximately 5% or less of input light 92 is transmitted through reflecting surface 86 as transmitted-out light Out0 defined by rays R0, and approximately 95% or more of input light 92 is reflected by reflecting surface 86 and is incident on area A1 of reflecting surface 88. Points P1 indicate peripheral points of area A1. After reflecting off area A1 on reflecting surface 88, input light 92 travels to reflecting surface 86 and is partially transmitted through reflecting surface 86 as transmitted-out light Out1 defined by rays R1. In this manner, as illustrated in FIG. 7, input light 92 experiences multiple reflections between reflecting surfaces 86 and 88, wherein each reflection off of reflecting surface 86 also results in a respective transmitted-out light being transmitted therethrough. Therefore, for example, each time right after input light 92 reflects off of areas A2, A3 and A4 on reflecting surface 88, input light 92 reflects off reflecting surface 86 to produce transmitted-out lights Out2, Out3 and Out4, respectively. Points P2 indicate peripheral points of area A2, points P3 indicate peripheral points of area A3, and points P4 indicate peripheral points of area A4. Transmitted-out light Out2 is defined by rays R2, transmitted-out light Out3 is defined by rays R3 and transmitted-out light Out4 is defined by rays R4. Although FIG. 7 only illustrates transmitted-out lights Out0, Out1, Out2, Out3 and Out4, there will actually be many more transmitted-out lights, depending on the power on input light 92 and the reflectances of reflecting surfaces 86 and 88.

As will be described in more detail below, the transmitted-out lights interfere with each other to produce a luminous flux as an output light. The direction of the output light changes in accordance with the wavelength of input light 92.

FIG. 7 illustrates an example of input light 92 comprising one wavelength. However, if the input light comprises a plurality of wavelengths (such as a wavelength division multiplexed light comprising a plurality of carriers, each at a different wavelength), the input light will be reflected in the same manner. However, a plurality of luminous fluxes will be formed corresponding, respectively, to the plurality of carriers. Each luminous flux will be output from the VIPA at a different angle than the other luminous fluxes.

Figure 8:
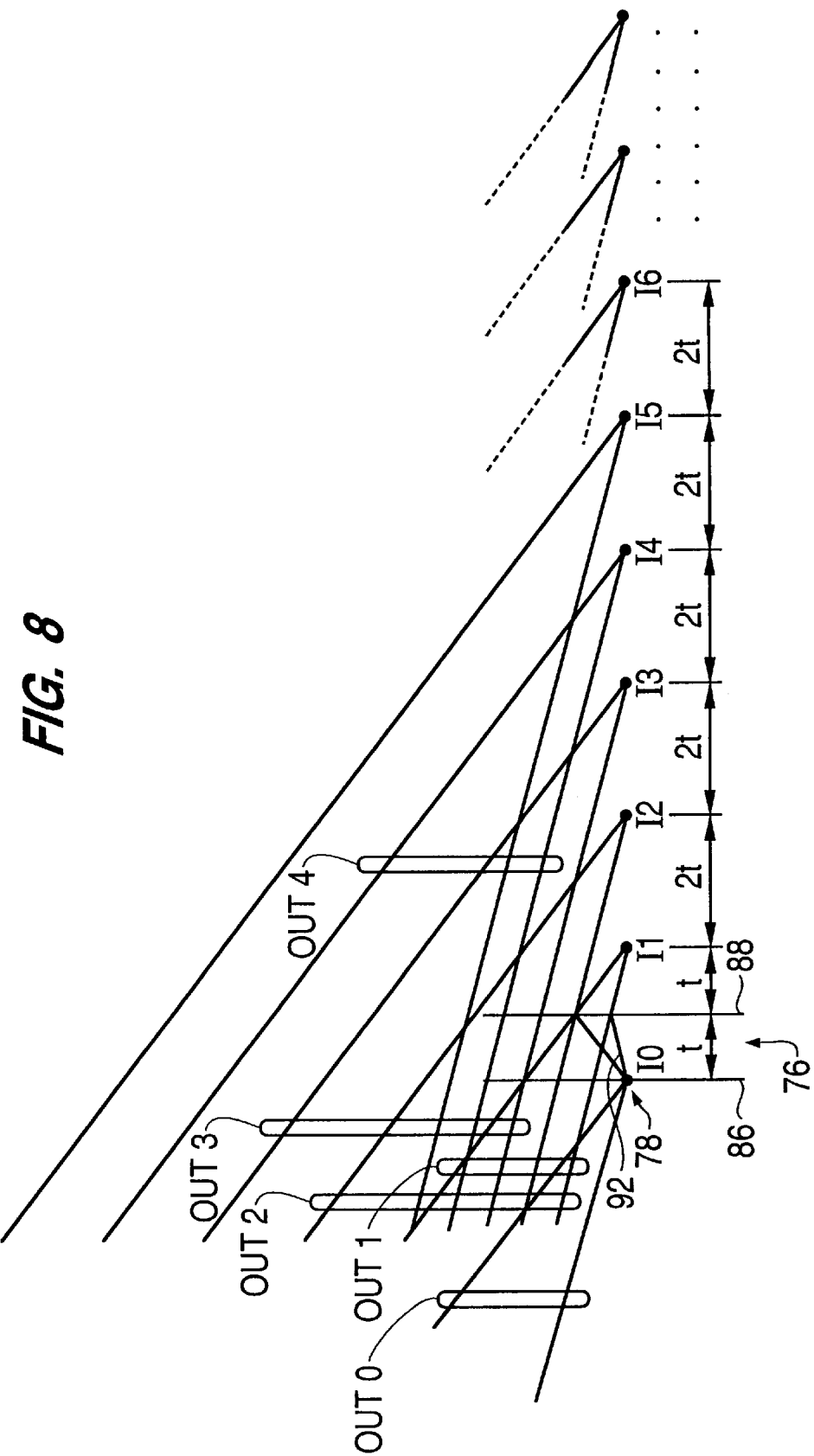
FIG. 8 is a diagram illustrating interference between reflections produced by a VIPA, according to an embodiment of the present invention.

FIG. 8 is a diagram illustrating interference between reflections produced by a VIPA, according to an embodiment of the present invention. Referring now to FIG. 8, light travelling from focal line 78 is reflected by reflecting surface 88 and then reflected by reflecting surface 86. As previously described, reflecting surface 88 has a reflectance of approximately 100% and, therefore, functions essentially as a mirror. As a result, transmitted-out light Out1 can be optically analyzed as if reflecting surfaces 86 and 88 did not exist and, instead, transmitted-out light Out1 was emitted from a focal line $I_1$. Similarly, transmitted-out lights Out2, Out3 and Out4 can be optically analyzed as if they were emitted from focal lines $I_2$, $I_3$ and $I_4$, respectively. The focal lines $I_1$, $I_2$, $I_3$ and $I_4$ are virtual images of the focal line $I_0$.

Therefore, as illustrated in FIG. 8, focal line $I_1$ is a distance 2t from focal line $I_0$, where t equals the distance between reflecting surfaces 86 and 88. Similarly, each subsequent focal line is a distance 2t from the immediately preceding focal line. Thus, focal line $I_2$ is a distance 2t from focal line $I_1$. Moreover, each subsequent multiple reflection between reflecting surfaces 86 and 88 produces a transmitted-out light which is weaker in intensity than the previous transmitted-out light. Therefore, transmitted-out light Out2 is weaker in intensity than transmitted-out light Out1.

As illustrated in FIG. 8, transmitted-out lights from the focal lines overlap and interfere with each other. Moreover, focal lines $I_1$, $I_2$, $I_3$ and $I_4$ are the virtual images of focal line $I_0$, and, therefore, transmitted-out lights Out0, Out1, Out2, Out3 and Out4 have the same optical phase at the positions of focal lines $I_0$, $I_1$, $I_2$, $I_3$ and $I_4$. Therefore, this interference produces a luminous flux which travels in a specific direction depending on the wavelength of input light 92.

A VIPA according to the above embodiments of the present invention has strengthening conditions which are characteristics of the design of the VIPA. The strengthening conditions increase the interference of the transmitted-out lights so that a luminous flux is formed. The strengthening conditions of the VIPA are represented by the following Equation (1):

$$2t \times \cos \phi = m\lambda$$

where $\phi$ indicates the propagation direction of the resulting luminous flux as measured from a line perpendicular to the surface of reflecting surfaces 86 and 88, $\lambda$ indicates the wavelength of the input light, t indicates the distance between the reflecting surfaces 86 and 88, and m indicates an integer.

Therefore, if t is constant and m is assigned a specific value, then the propagation direction $\phi$ of the luminous flux formed for input light having wavelength $\lambda$ can be determined.

More specifically, input light is radially dispersed from focal line 78 through a specific angle. Therefore, input light having the same wavelength will be travelling in many different direction from focal line 78, to be reflected between reflecting surfaces 86 and 88. The strengthening conditions of the VIPA cause light travelling in a specific direction to be strengthened through interference of the transmitted-out lights to form a luminous flux having a direction corresponding to the wavelength of the input light. Light travelling in a different direction than the specific direction required by the strengthening condition will be weakened by the interference of the transmitted-out lights.

Moreover, if the input light includes light having a plurality of different wavelengths, the strengthening conditions will cause a different luminous flux to be formed for each wavelength in the input light. Each luminous flux will be at a different wavelength. Therefore, the VIPA can receive a wavelength division multiplexed light and produce a plurality of luminous fluxes travelling in different directions and corresponding to the various wavelengths in the wavelength division multiplexed light.

Figure 9:
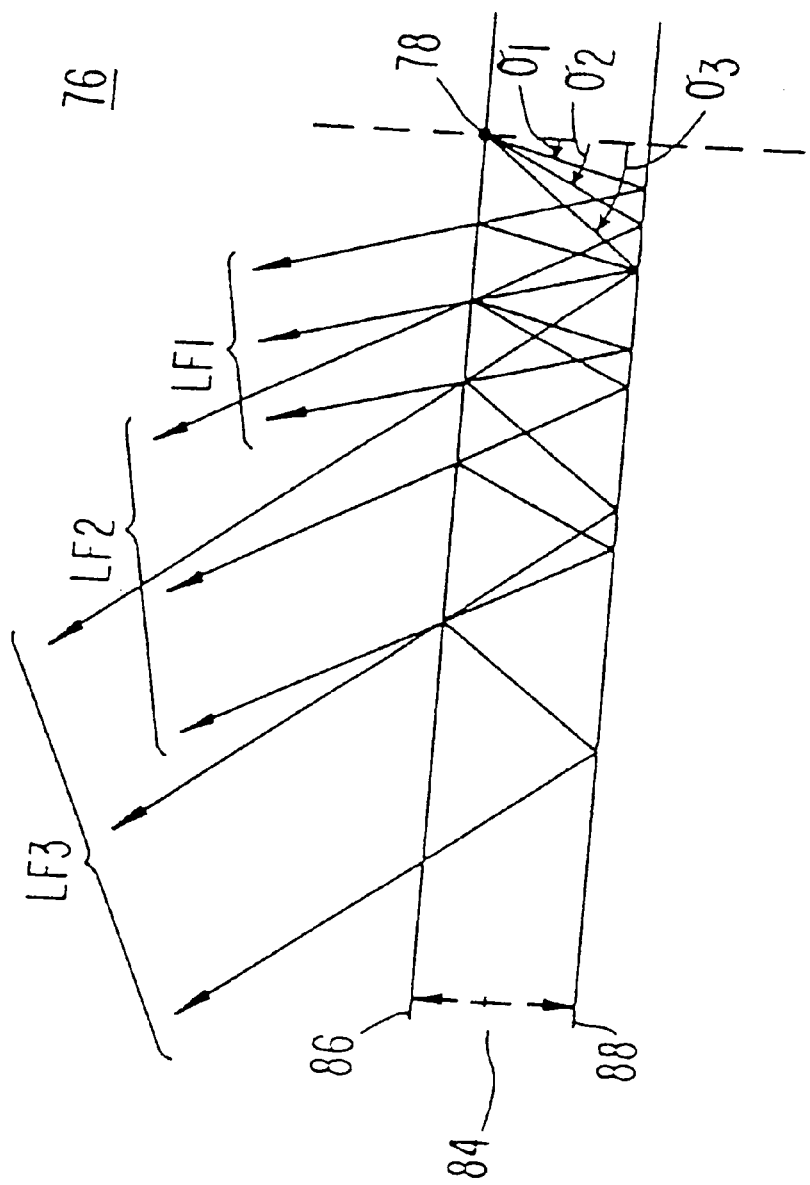
FIG. 9 is a diagram illustrating a cross-section along lines VII—VII of the VIPA illustrated in FIG. 6, to show the formation of a luminous flux, according to an embodiment of the present invention.

FIG. 9 is a diagram illustrating the formation of a luminous flux by VIPA 76, according to an embodiment of the present invention, and represents a cross-section along lines VII in FIG. 6. More specifically, FIG. 9 illustrates that VIPA 76 can form a plurality of luminous fluxes, where each luminous flux has a different propagation direction depending on the wavelength of the input light.

Referring now to FIG. 9, input light having a plurality of wavelengths is radially dispersed from focal line 78 so that the light is reflected between reflecting surfaces 86 and 88. Assume that the input light includes light having three different wavelengths. Therefore, light having each wavelength will be dispersed in many different direction from focal line 78. The strengthening conditions of VIPA 76 cause light of the same wavelength and travelling in a specific direction to be strengthened by light travelling in different directions, to form a luminous flux having a direction corresponding to the wavelength of the input light. Therefore, for example, light having a wavelength $\lambda 1$ and propagating in the direction $\theta 1$ from focal line 78 will be strengthened by light travelling in different directions and will form a luminous flux LF1 having a propagation direction $\theta 1$. Similarly, light having a wavelength $\lambda 2$ and propagating in the direction $\theta 2$ from focal line 78 will be strengthened by light travelling in different directions and will form a luminous flux LF2 having a prorogation direction $\theta 2$. Also, light having a wavelength $\lambda 3$ and propagating in the direction $\theta 3$ from focal line 78 will be strengthened by light travelling in different directions and will form a luminous flux LF3 having a prorogation direction $\theta 3$.

As described above, Equation (1) should be satisfied to increase the interference among transmitted-out lights forming a luminous flux. Moreover, the thickness t of material 84 is preferably fixed. Therefore, the angle range of incidence of input light should be set so that input light will enter VIPA 76 with a propagation direction $\phi$ which will satisfy Equation (1). More specifically, the propagation direction of input light can be fixed, the distance t between reflecting surfaces 86 and 88 can be fixed, and the wavelength of input light can be determined in advance. Therefore, the specific angle of the luminous flux produced for each wavelength in the input light can be determined, and the strengthening conditions of VIPA 76 can be satisfied.

Moreover, since input light radiates from the focal line 78 in many different direction, it can be assured that input light will propagate at an angle which satisfies the strengthening conditions.

Figure 10:
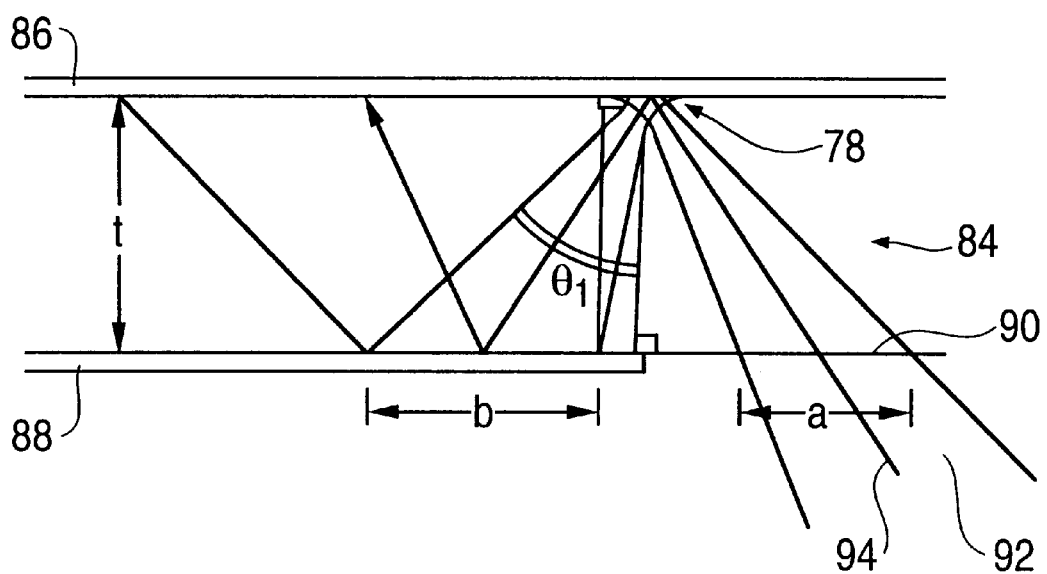
FIG. 10 is a diagram illustrating a cross-section along lines VII—VII of the VIPA illustrated in FIG. 6, showing characteristics of a VIPA for determining the tilt angle of input light, according to an embodiment of the present invention.

FIG. 10 is a diagram illustrating a cross-section along lines VII—VII of the VIPA illustrated in FIG. 6, showing characteristics of a VIPA for determining the angle of incidence, or tilt angle, of input light, according to an embodiment of the present invention.

Referring now to FIG. 10, input light 92 is collected by a cylindrical lens (not illustrated) and focused at focal line 78. As illustrated in FIG. 10, input light 92 covers an area having a width equal to "a" on radiation window 90. After input light 92 is reflected one time from reflecting surface 86, input light 92 is incident on reflecting surface 88 and covers an area having a width equal to "b" on reflecting surface 88. Moreover, as illustrated in FIG. 10, input light 92 travels along an optical axis 94 which is at a tilt angle θ1 with respect to the normal to reflecting surface 86.

The tilt angle θ1 should be set to prevent input light 92 from travelling out of material 84 through radiation window 90 when incident to the VIPA and to prevent input light 92 from travelling out of reflecting surface 88 after being reflected the first time by reflecting surface 86. In other words, the tilt angle θ1 should be set so that input light 92 remains "trapped" between reflecting surfaces 86 and 88 and does not escape through radiation window 90. Therefore, to prevent input light 92 from travelling out of material 84 through radiation window 90, the tilt angle θ1 should be set in accordance with the following Equation (2):

tilt of optical axis $\theta_1 \geq (a+b)/4t$

Therefore, as illustrated by FIGS. 6–10, embodiments of the present invention include a VIPA which receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 7 illustrates an input light 92 which experiences multiple reflection between reflecting surfaces 86 and 88. This multiple reflection produces a plurality of transmitted-out lights Out0, Out1, Out2, Out3 and Out4 which interfere with each other to produce a luminous flux (such as luminous fluxes LF1, LF2 or LF3 illustrated in FIG. 9).

"Self-interference" is a term indicating that interference occurs between a plurality of lights or beams which all originate from the same source. Therefore, the interference of transmitted-out lights Out0, Out1, Out2, Out3 and Out4 is referred to as self-interference of the input light 92, since transmitted-out lights Out0, Out1, Out2, Out3 and Out4 all originate from the same source (that is, input light 92).

According to the above embodiments of the present invention, an input light can be at any wavelength within a continuous range of wavelengths. Thus, the input light is not limited to being a wavelength which is a value chosen from a range of discrete values.

Figure 2:
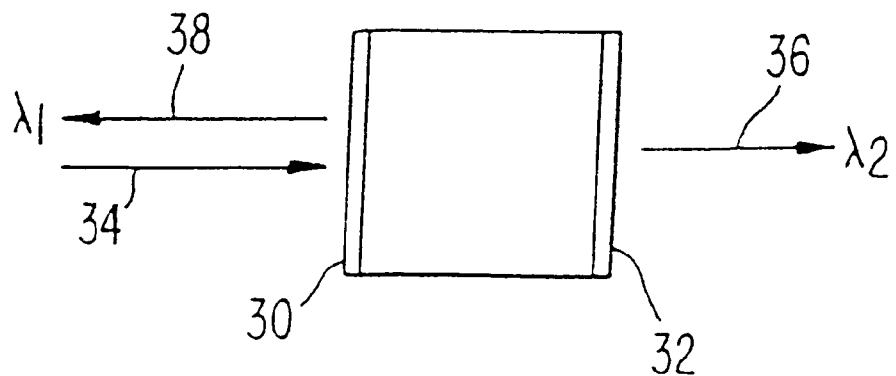
FIG. 2 (prior art) is a diagram illustrating a conventional Fabry-Perot interferometer.
Figure 3:
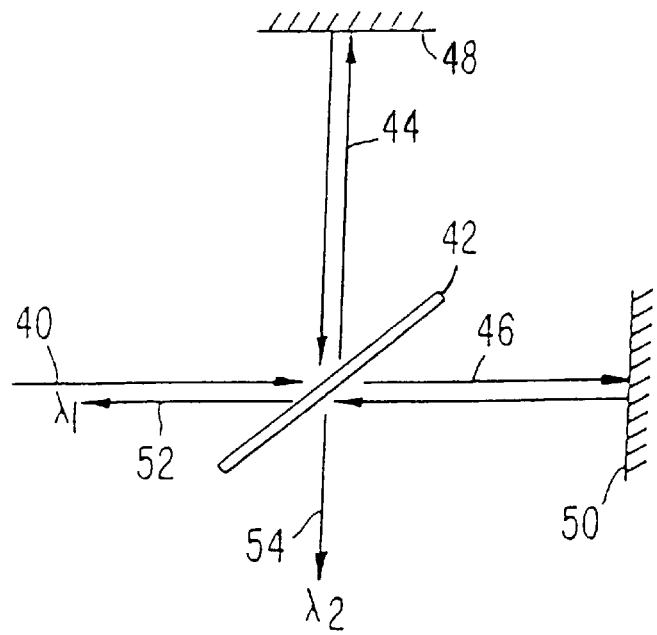
FIG. 3 (prior art) is a diagram illustrating a conventional Michelson interferometer.
Figure 4:
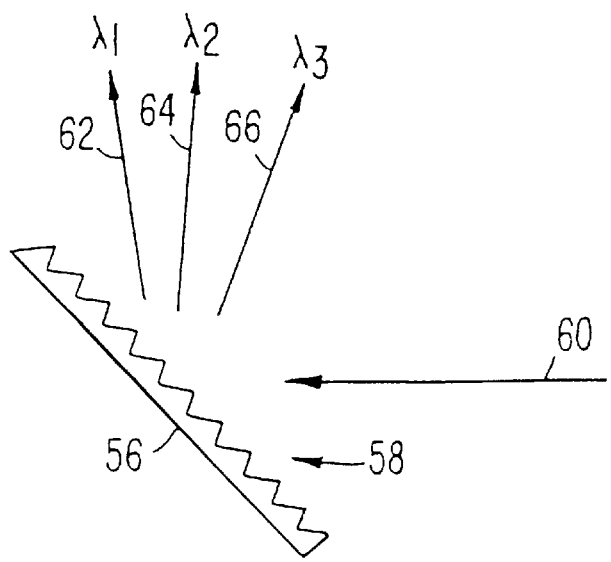
FIG. 4 (prior art) is a diagram illustrating a conventional diffraction grating.
Figure 5:
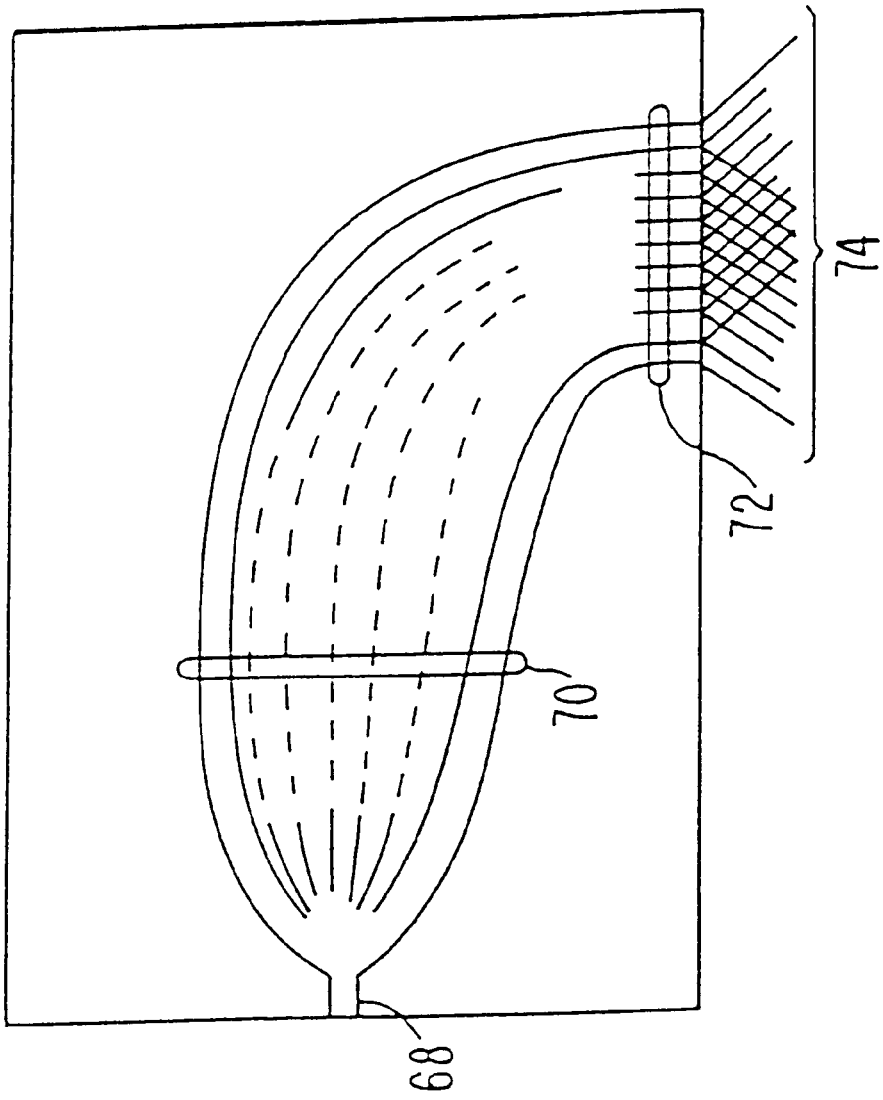
FIG. 5 (prior art) is a diagram illustrating a conventional array waveguide grating for splitting a wavelength division multiplexed light.

In addition, according to the above embodiments of the present invention, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 6, the travelling direction (that is, a "spatial characteristic") of the luminous flux 82 is different when input light 77 is at different wavelengths within a continuous range of wavelengths. This operation can be compared to conventional wavelength splitting devices illustrated in FIGS. 1–3, where an output light is spatially distinguishable for two different wavelengths of the input light, but cannot produce a spatially distinguishable output light for each wavelength within a continuous range of wavelengths of the input light. For example, in the filter illustrated in FIG. 1, all carriers in a wavelength division multiplexed light which do not have the wavelength λ2 will be output as light 28.

Figure 11:
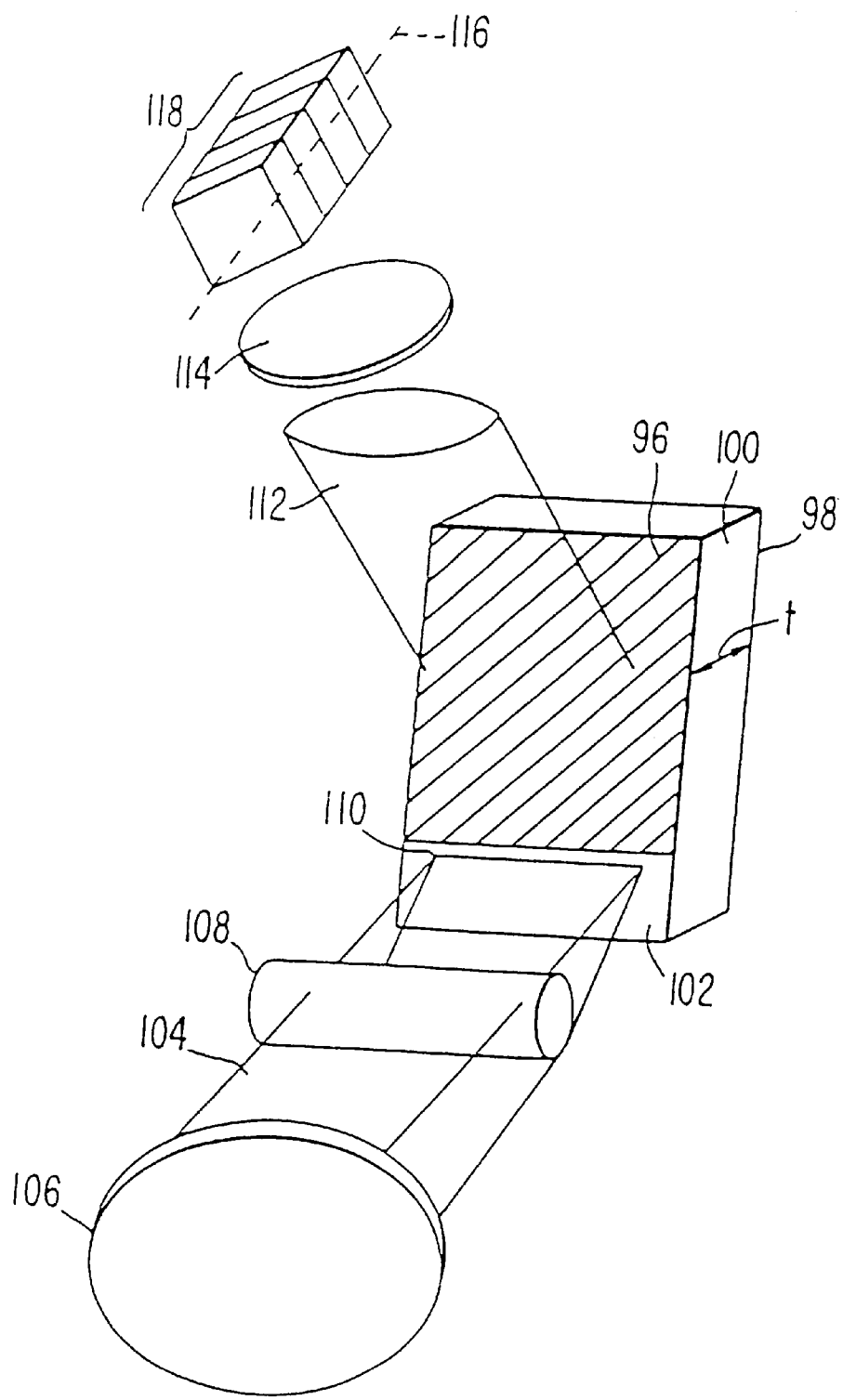
FIG. 11 is a diagram illustrating a VIPA as used with a receiver, according to an embodiment of the present invention.

FIG. 11 is a diagram illustrating a VIPA as used with a receiver, according to an embodiment of the present invention. Referring now to FIG. 11, multiple-layer reflecting films 96 and 98 are applied on both sides of a parallel plate 100 made of glass having a thickness, t, of, for example, 100 μm. It is preferable for parallel plate 100 to have a thickness in the range of 20 to 2000 μm. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different value as long as enough light is reflected from reflecting film 96 to allow for multiple reflections between reflecting films 96 and 98. Preferably, the reflectance of reflecting film 96 is in the range of 80% to a few percentages less than 100%. Moreover, the reflectance of reflecting film 98 is not limited to 100%, but should be high enough to allow multiple reflections between reflecting films 96 and 98.

A radiation window 102 receives input light and is positioned on parallel plate 100 on the same surface as reflecting film 96. Radiation window 102 can be formed by a film having approximately 0% reflectance on the surface of parallel plate 100. As illustrated in FIG. 11, the boundary between radiation window 102 and reflecting film 96 is preferably a straight line.

The input light is output from, for example, an optical fiber (not illustrated) and received by a collimating lens 106. Collimating lens 106 converts the input light into parallel beams 104 which are received by a cylindrical lens 108. Cylindrical lens 108 focuses parallel beams 104 into a focal line 110 on reflecting film 98, or at some point inside parallel plate 100. In this manner, input light enters parallel plate 100 via radiation window 102.

The optical axis of the input light is at a tilt angle with respect to the normal to reflecting film 96 so that input light will not escape through radiation window 102 after entering parallel plate 100. Thus, the tilt angle is set in accordance with Equation (2), above.

Once inside parallel plate 100, the input light experiences multiple reflection between reflecting films 96 and 98 (as illustrated, for example, in FIG. 7). Each time the input light is incident on reflecting film 96, approximately 95% of the light is reflected towards reflecting film 98 and approximately 5% of the light passes through reflecting film 96 to form a transmitted-out light (such as, for example, transmitted-out light Out1 illustrated in FIG. 7). Multiple reflections between reflecting films 96 and 98 cause a plurality of transmitted-out lights to be formed. The plurality of transmitted-out lights interfere with each other to form a luminous flux 112 having a propagation direction which depends on the wavelength of the input light.

Luminous flux 112 is then collected by a lens 114, which focuses luminous flux 112 at a collection point. The collection point moves along a straight line path 116 for different wavelengths of the input light. For example, as the wavelength of the input light increases, the collection point is moved farther along straight line path 116. A plurality of receivers 118 are arranged on straight line path 116 to receive the focused luminous flux 112. Therefore, each receiver 118 can be positioned to receive a luminous flux corresponding to a specific wavelength.

By controlling the distance t between the reflecting films or reflecting surfaces of the VIPA, the phase difference of light reflected between the reflecting films or reflecting surfaces can be shifted by a predetermined amount, thereby realizing excellent environmental resistance. Moreover, the above embodiments of the present invention experience only a small change in optical characteristics depending on the optical polarization.

Figure 12:
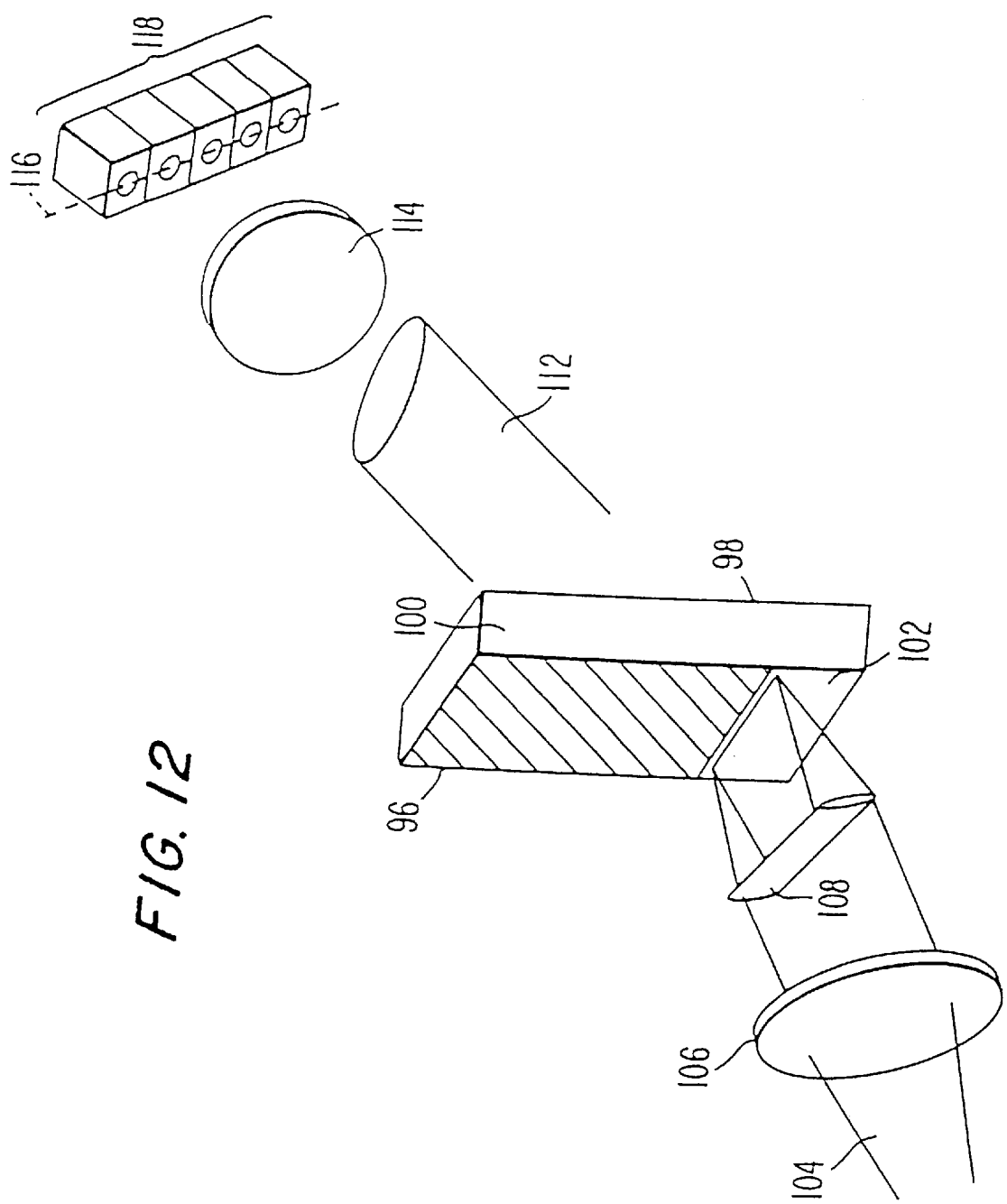
FIG. 12 is a diagram illustrating a VIPA as used with a receiver, according to an additional embodiment of the present invention.

FIG. 12 is a diagram illustrating a VIPA as used with a receiver, according to an additional embodiment of the present invention. The VIPA illustrated in FIG. 12 is similar to the VIPA illustrated in FIG. 11, except that the reflectances of reflecting films 96 and 98 are reversed. More specifically, in the VIPA illustrated in FIG. 12, reflecting film 98 has a reflectance of approximately 95% and reflecting film 96 has a reflectance of approximately 100%. As illustrated in FIG. 12, luminous flux 112 is formed through interference of transmitted-out lights travelling through reflecting film 98. Thus, the input light enters one side of parallel plate 100, and luminous flux 112 is formed on the opposite side of parallel plate 100. Otherwise, the VIPA illustrated in FIG. 12 operates in a similar manner as the VIPA illustrated in FIG. 11.

Figure 13:
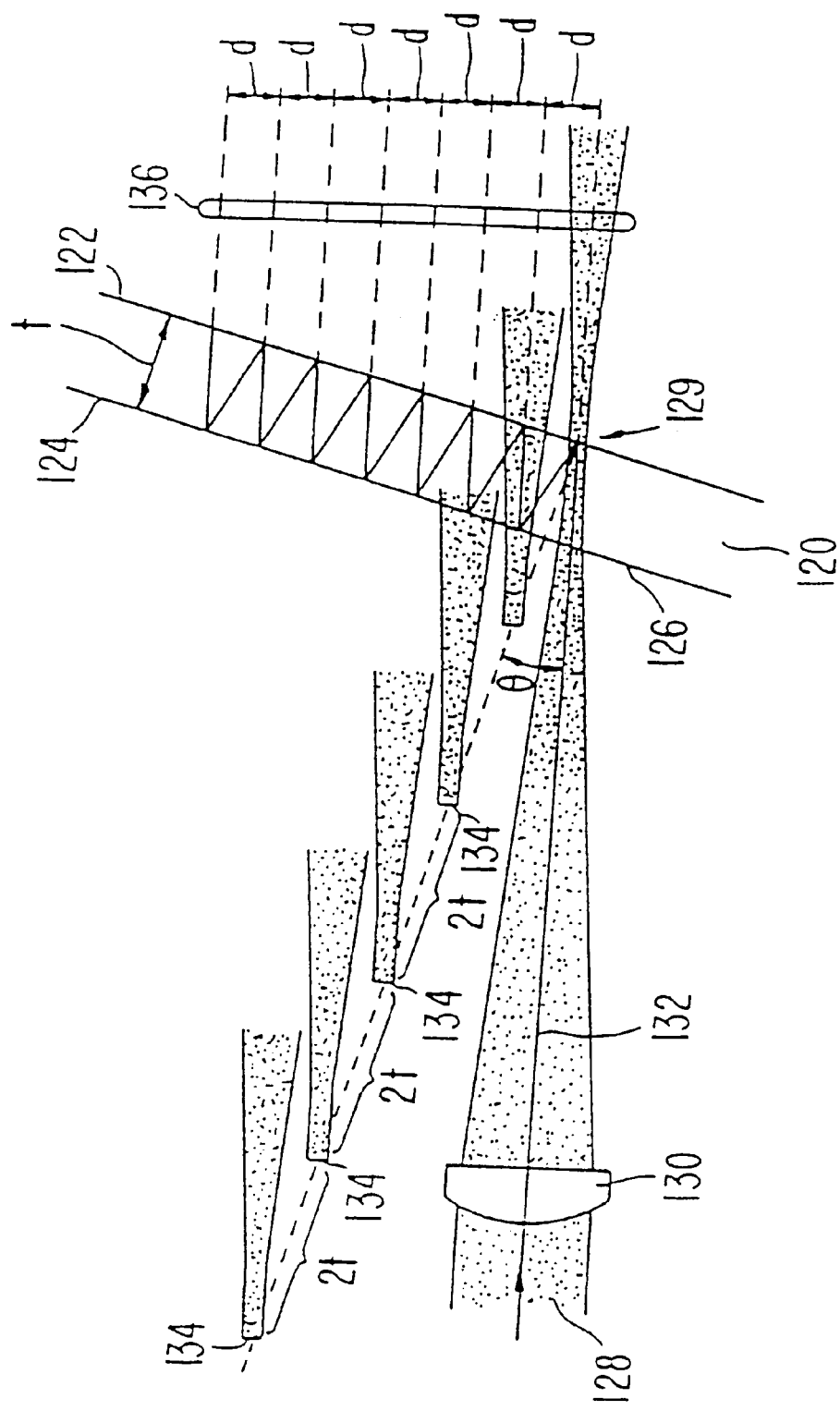
FIG. 13 is a diagram illustrating a VIPA according to a further embodiment of the present invention.

FIG. 13 is a diagram illustrating a VIPA according to a further embodiment of the present invention. Referring now to FIG. 13, a plate 120 made of, for example, glass, has reflecting films 122 and 124 thereon. Reflecting film 122 has a reflectance of approximately 95% or higher, but less than 100%. Reflecting film 124 has a reflectance of approximately 100%. A radiation window 126 has a reflectance of approximately 0% reflectance.

Input light 128 is focused into a focal line 129 by a cylindrical lens 130 through radiation window 126. Focal line 129 is on the surface of plate 120 to which reflecting film 122 is applied. Thus, focal line 129 is essentially line focused onto reflecting film 122 through radiation window 126. The width of focal line 129 can be referred to as the "beam waist" of input light 128 as focused by cylindrical lens 130. Thus, the embodiment of the present invention as illustrated is FIG. 13 focuses the beam waist of input light 128 onto the far surface (that is, the surface having reflecting film 122 thereon) of plate 120. By focusing the beam waist on the far surface of plate 120, the present embodiment of the present invention reduces the possibility of overlap between (i) the area of radiation window 126 on the surface of plate 120 covered by input light 128 as it travels through radiation window 126 (for example, the area "a" illustrated in FIG. 10), and (ii) the area on reflecting film 124 covered by input light 128 when input light 128 is reflected for the first time by reflecting film 124 (for example, the area "b" illustrated in FIG. 10). It is desirable to reduce such overlap to ensure proper operation of the VIPA.

In FIG. 13, the optical axis 132 of input light 128 has a small tilt angle θ. Upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 13, the light is split into many paths with a constant separation d. The beam shape in each path forms so that the light diverges from virtual images 134 of beam waist 129. Virtual images 134 are located with constant spacing 2t along a line that is normal to the plate, where t is the thickness of plate 120. The positions of the beam waists in virtual images 134 are self-aligned, and there is no need to adjust individual positions. Then, the lights diverging from virtual images 134 interfere with each other and form collimated light 136 which propagates in a direction that changes in accordance with the wavelength of input light 128.

The spacing of light paths is d=2t Sin θ, and the difference in the path lengths between adjacent beams is 2t Cos θ. The angular dispersion is proportional to the ratio of these two numbers, which is cot θ. As a result, the embodiments of the present invention produce a significantly large angular dispersion between luminous fluxes for different carriers, as compared to conventional wavelength splitters.

As previously indicated, embodiments of the present invention are referred to as a "virtually imaged phased array". As easily seen from FIG. 13, the term "virtually imaged phased array" arises from the formation of an array of virtual images 134.

FIG. 14 is a diagram illustrating a waveguide type VIPA, according to an embodiment of the present invention. Referring now to FIG. 14, light 138 is output from an optical fiber (not illustrated) and received by a waveguide 140 provided on a substrate 142. Waveguide 140 is, for example, lithium niobate. Light 138 contains optical signals modulated on a plurality of carriers having different wavelengths.

Light 138 typically has a dispersed width as it is output from the optical fiber. Therefore, a collimating lens 142 converts light 138 into parallel light. The parallel light is then collected by a cylindrical lens 144 and focused into a focal line 146. The light then radiates into a VIPA 148 from focal line 146 through a radiation window 150.

VIPA 148 comprises reflecting films 152 and 154 on a parallel plate 156. Reflecting film 154 is on one side of a parallel plate 156, and reflecting film 152 and radiation window 150 are on the other side of parallel plate 156. Reflecting film 152 has a reflectance of approximately 100%, and reflecting film 154 has a reflectance of less than 100%. A luminous flux 158 of light reflected by parallel plate 156 is output to the side of parallel plate 156 opposite to radiation window 150.

If input light 138 includes a plurality of wavelengths, a plurality of luminous fluxes 158 will be formed which travel in different directions depending of the wavelengths of input light 138. Luminous flux 158 formed by VIPA 148 is focused by a lens 160 at different points, depending on the propagation direction of luminous flux 158. Therefore, as illustrated in FIG. 14, luminous fluxes 158a, 158b and 158c having wavelengths λ1, λ2, and λ3, respectively, are formed at different collection points.

A plurality of receiving waveguides 162 are provided at the collection points. Each receiving waveguide 162 guides an optical signal and corresponding carrier having a single wavelength. Therefore, a plurality of luminous fluxes can be simultaneously received and transmitted through various channels. Each receiving waveguide 162 has a corresponding receiver (not illustrated) provided at a later stage. The receiver is typically a photodiode. Therefore, light guided by each receiving waveguides 162 is processed after being detected by the corresponding receiver.

FIGS. 15(A), 15(B), 15(C) and 15(D) are diagram illustrating a method for producing a VIPA, according to an embodiment of the present invention.

Figure 15A:
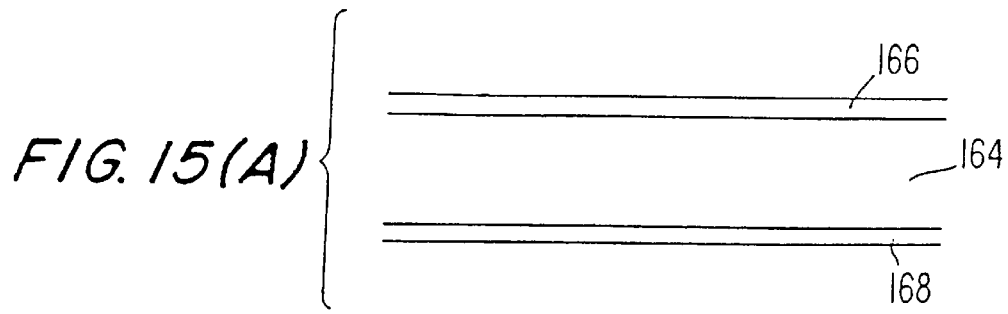
FIGS. 15 (A), 15(B), 15(C) and 15(D) are diagrams illustrating a method for producing a VIPA, according to an embodiment of the present invention.

Referring now to FIG. 15(A), a parallel plate 164 is preferably made of glass and exhibits excellent parallelism. Reflecting films 166 and 168 are formed on both sides of the parallel plate 164 by vacuum deposition, ion spattering or other such methods. One of reflecting films 166 and 168 has a reflectance of nearly 100%, and the other reflecting film has a reflectance of lower than 100%, and preferably higher than 80%.

Figure 15B:
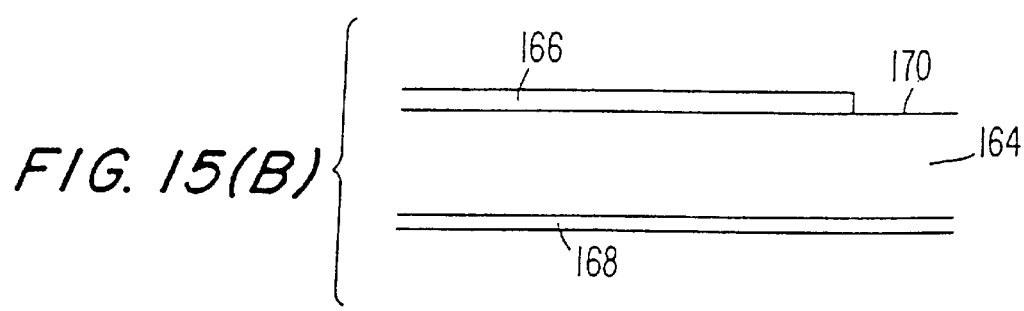

Referring now to FIG. 15(B), one of reflecting films 166 and 168 is partially shaved off to form a radiation window 170. In FIG. 15(B), reflecting film 166 is shown as being shaved off so that radiation window 170 can be formed on the same surface of parallel plate 164 as reflecting film 166. However, instead, reflecting film 168 can be partially shaved off so that a radiation window is formed on the same surface of parallel plate 164 as reflecting film 168. As illustrated by the various embodiment of the present invention, a radiation window can be on either side of parallel plate 164.

Shaving off a reflecting film can be performed by an etching process, but a mechanical shaving process can also be used and is less expensive. However, if a reflecting film is mechanically shaved, parallel plate 164 should be carefully processed to minimize damage to parallel plate 164. For example, if the portion of parallel plate 164 forming the radiation window is severely damaged, parallel plate 164 will generate excess loss caused by scattering of received input light.

Instead of first forming a reflecting film and then shaving it off, a radiation window can be produced by preliminarily masking a portion of parallel plate 164 corresponding to a radiation window, and then protecting this portion from being covered with reflecting film.

Figure 15C:
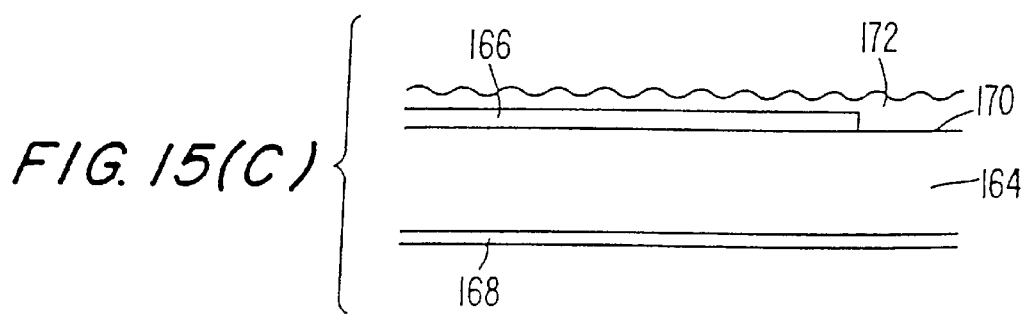

Referring now to FIG. 15(C), a transparent adhesive 172 is applied onto reflecting film 166 and the portion of parallel plate 164 from which reflecting film 166 has been removed. Transparent adhesive 172 should generate the smallest possible optical loss since it is also applied to the portion of parallel plate 164 forming a radiation window.

Figure 15D:
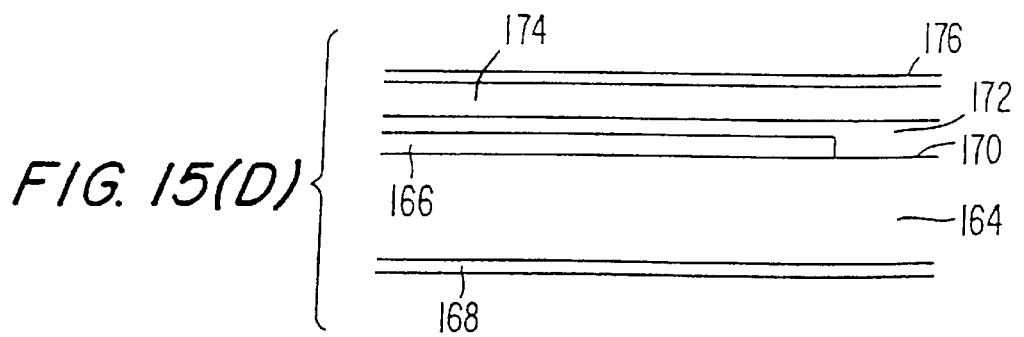

Referring now to FIG. 15(D), a transparent protector plate 174 is applied onto transparent adhesive 172 to protect reflecting film 166 and parallel plate 164. Since transparent adhesive 172 is applied to fill the concave portion generated by removing reflecting film 166, transparent protector plate 174 can be provided in parallel with the top surface of parallel plate 164.

Similarly, to protect reflecting film 168, an adhesive (not illustrated) can be applied to the top surface of reflecting film 168 and should be provided with a protector plate (not illustrated). If reflecting film 168 has a reflectance of about 100%, and there is no radiation window on the same surface of parallel plate 164, then an adhesive and protector plate do not necessarily have to be transparent.

Furthermore, an anti-reflection film 176 can be applied on transparent protector plate 174. For example, transparent protector plate 174 and radiation window 170 can be covered with anti-reflection film 176.

According to the above embodiments of the present invention, a focal line is described as being on the opposite surface of a parallel plate from which input light enters. However, the focal line can be in the parallel plate, on the radiation window, or before the radiation window.

According to the above embodiments of the present invention, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light travelling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

According to the above embodiments of the present invention, a VIPA is described as being formed by a parallel plate, or by two reflecting surfaces in parallel with each other. However, the plate or reflecting surfaces do not necessarily have to be parallel.

According to the above embodiments of the present invention, a light which includes a plurality of wavelengths can be simultaneously divided. Therefore, a receiver for use in wavelength multiplexing communications can be successfully reduced in size.

According to the above embodiments of the present invention, a VIPA can simultaneously split a wavelength division multiplexed light for each wavelength of the light. Moreover, the angle of dispersion can be adjusted by the thickness t of the parallel plate forming the VIPA. As a result, the angle of dispersion can be made large enough to allow a receiver to easily receive each split signal. For example, a conventional diffraction grating requires a fine concavo-convex surface for a large angle of dispersion. However, it is very difficult to prepare a fine and precise concavo-convex surface, thereby limiting the size of the angle of dispersion. By contrast, a VIPA according to the above embodiments of the present invention only requires a change in thickness of the parallel plate to realize a relatively large angle of dispersion.

Moreover, a VIPA according to the above embodiments of the present invention produces a larger angle of dispersion than a conventional diffraction grating. Therefore, a receiver which uses a VIPA according to the above embodiments of the present invention can correctly receive an optical signal, without fail, even in wavelength multiplexing communications realizing high-level multiplexing processes. Furthermore, such a receiver has a relatively simple construction and is relatively inexpensive to produce.

According to the above embodiments of the present invention, a VIPA uses multiple-reflection and maintains a constant phase difference between interfering lights. As a result, the characteristics of the VIPA are stable, thereby reducing optical characteristic changes caused by polarization. By contrast, the optical characteristics of a conventional diffraction grating experience undesirable changes in dependance on the polarization of the input light.

Moreover, as compared to an array waveguide grating, a VIPA according to the above embodiments of the present invention requires a relatively simple configuration and achieves stable optical characteristics and resistance to changes in environmental conditions.

The above embodiments of the present invention are described as providing luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the present invention is not intended to be limited to these precise examples, and there are many other ways in which luminous fluxes can be spatially distinguished from each other.

A VIPA has a corresponding free spectral range determined by the thickness t between the reflecting surfaces of the VIPA (such as the thickness t between reflecting surfaces 86 and 88 in FIG. 7). This free spectral range limits the wavelength band of the VIPA when used as a wavelength splitter, since, generally, the wavelength band is substantially equal to the free spectral range. For example, if the thickness t is 50 μm, the wavelength band of the VIPA is 16 nm, and the output angle for each successive 16 nm wavelength band is repeated.

Therefore, the input light to the VIPA may fall within a relatively wide wavelength range. This wavelength range will be divided into a plurality of wavelength bands determined by the free spectral range of the VIPA. For each wavelength band, the output angle from the VIPA is repeated.

It is often desirable to provide a VIPA with broader wavelength bands. For example, due to recent technological advances, the bandwidth of optical amplifiers has been greatly increased. It would be desirable to have a VIPA with broad wavelength bands, or bandwidth, to effectively split the light amplified by the optical amplifier. To do this, the thickness t between the reflecting surfaces of the VIPA must be made thinner. However, a VIPA with a thickness t less than 50 μm cannot be easily manufactured.

To solve the problem of the limited wavelength band of a VIPA, a VIPA can be used in combination with a wavelength splitter (also referred to as a demultiplexer) to provide an apparatus having a broad wavelength band.

Figure 16A:
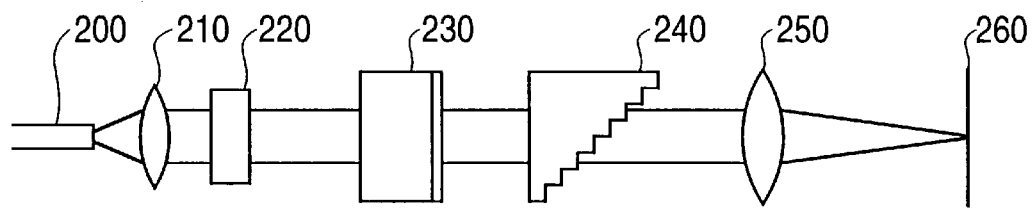
FIGS. 16(A) and 16(B) are diagrams illustrating a top view and a side view, respectively, of an apparatus which combines a VIPA with a demultiplexer, such as a diffraction grating, according to an embodiment of the present invention.
Figure 16B:
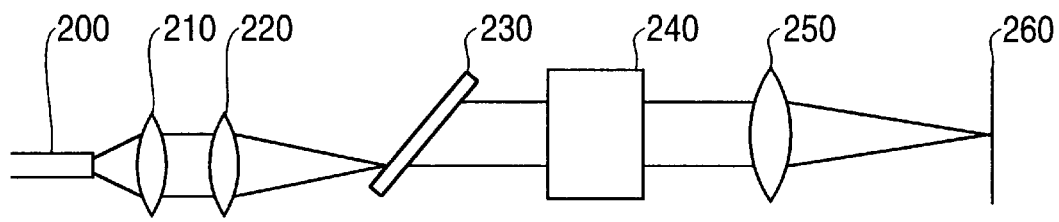

More specifically, FIGS. 16(A) and 16(B) are diagrams illustrating an apparatus which combines a VIPA with a demultiplexer, according to an embodiment of the present invention. FIG. 16(A) is a top view and FIG. 16(B) is a side view of the apparatus.

Referring now to FIGS. 16(A) and 16(B), an input light, such as a wavelength division multiplexed light, travels from a fiber 200 to a collimating lens 210. Collimating lens 210 collimates the input light and provides the collimated light to a semi-cylindrical lens 220. Semi-cylindrical lens 220 line-focuses the light into a VIPA 230.

VIPA produces an output light (such as a luminous flux) which is provided to a demultiplexer, such as diffraction grating 240. Diffraction grating 240 demultiplexes the light into a plurality of separated lights, or luminous fluxes, which are focused by a focusing lens 250 to a focal plane 260.

Figure 17A:
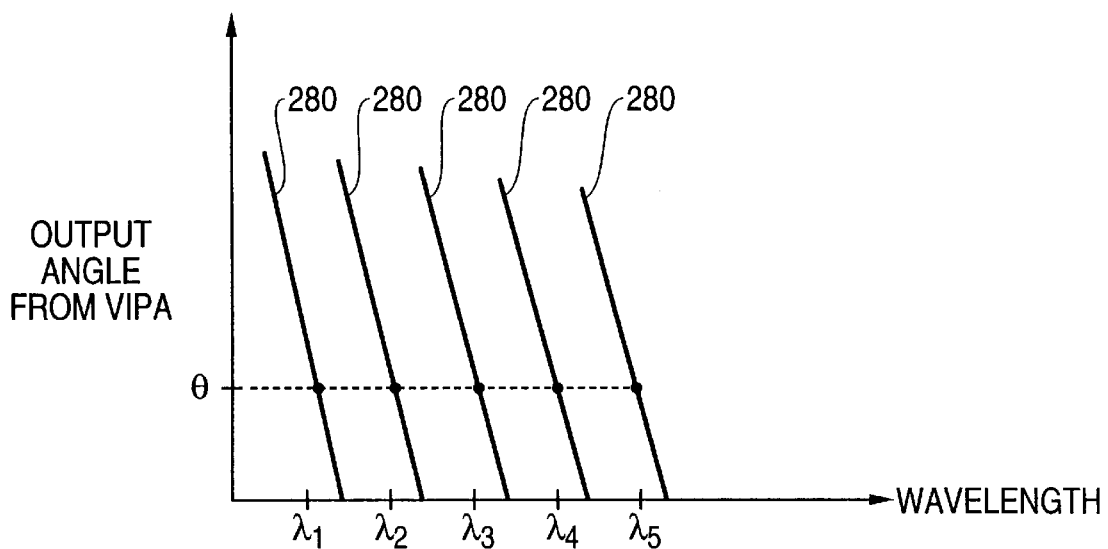
FIG. 17(A) is a graph illustrating wavelength versus output angle of a VIPA, according to an embodiment of the present invention.

Generally, a VIPA, such as VIPA 230, has a relatively high resolution in a narrow wavelength range. For example, FIG. 17(A) is a graph illustrating wavelength versus output angle of a VIPA. Referring now to FIG. 17(A), a VIPA has a plurality of repeating wavelength bands 280 which are determined by the free spectral range of the VIPA. Generally, the bandwidth of each wavelength band 280 is substantially equal to the free spectral range.

As illustrated in FIG. 17(A), wavelengths $\lambda_1$, $\lambda_2$, $\lambda_3$, $\lambda_4$ and $\lambda_5$ are each dispersed from the VIPA at the same output angle θ. Therefore, the VIPA will disperse an output light at output angle θ having wavelength components corresponding to wavelengths $\lambda_1$, $\lambda_2$, $\lambda_3$, $\lambda_4$ and $\lambda_5$.

Figure 17B:
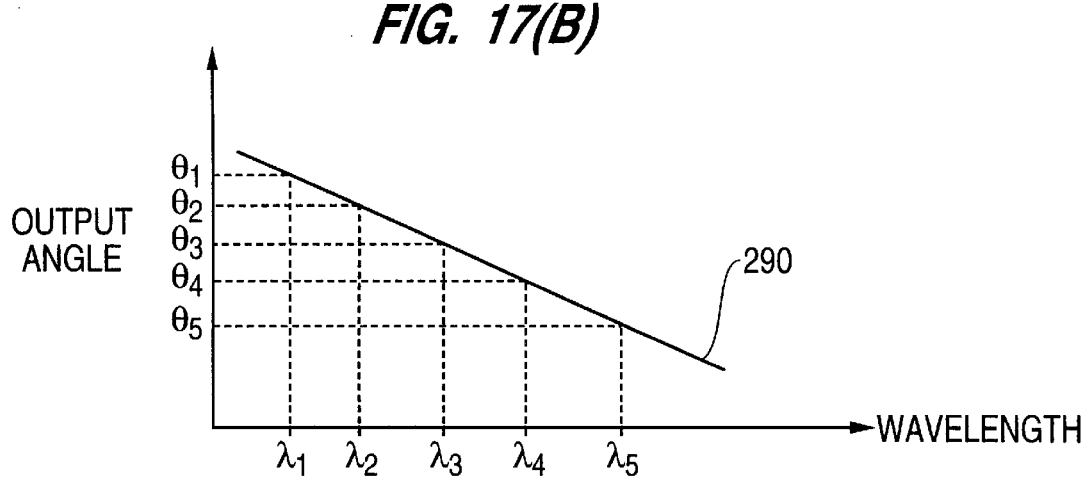
FIG. 17(B) is a graph illustrating wavelength versus output angle of a diffraction grating.

By contrast, FIG. 17(B) is a graph illustrating wavelength versus output angle of a diffraction grating. Referring now to FIG. 17 (B), the diffraction grating has a broad wavelength band 290 which includes wavelengths $\lambda_1$, $\lambda_2$, $\lambda_3$, $\lambda_4$ and $\lambda_5$. The diffraction grating will disperse wavelengths $\lambda_1$, $\lambda_2$, $\lambda_3$, $\lambda_4$ and $\lambda_5$ at output angles $\theta_1$, $\theta_2$, $\theta_3$, $\theta_4$ and $\theta_5$, respectively.

From FIGS. 17(A) and 17(B), it can be seen that a VIPA will allow relatively close wavelengths within a wavelength band (such as wavelength bands 280) to be output at significantly different output angles. Therefore, a VIPA has a relatively high resolution, but in a narrow wavelength band. By contrast, a diffraction grating allows wavelengths over a broad wavelength band to be separated, but the output angles will be relatively close together. Therefore, a diffraction grating has a relatively low resolution, but over a broad wavelength band.

FIGS. 16(A) and 16(B) can now be easily understood by referring to the resolutions of VIPA 230 and diffraction grating 240. More specifically, referring again to FIGS. 16(A) and 16(B), the input light is first demultiplexed with the relatively high resolution VIPA 230, and then further demultiplexed with the relatively low resolution diffraction grating 240.

FIG. 18 is a diagram illustrating an example of the operation of the VIPA-diffraction apparatus, according to an embodiment of the present invention. Referring now to FIG. 18, VIPA 230 receives an input light 295 having wavelengths $\lambda_1$, $\lambda_2$, $\lambda_3$, $\lambda_4$, $\lambda_5$, $\lambda_6$, $\lambda_7$, $\lambda_8$, $\lambda_9$, $\lambda_{10}$, $\lambda_{11}$ and $\lambda_{12}$. In response, VIPA 230 produces a plurality of luminous fluxes, or output lights, 300, 310, 320, 330 and 340, propagating away from VIPA 230. Output light 300 includes wavelengths $\lambda_1$, $\lambda_6$ and $\lambda_6$. Output light 310 includes wavelengths $\lambda_2$, $\lambda_7$ and $\lambda_{12}$. Output light 320 includes wavelengths $\lambda_3$ and $\lambda_8$. Output light 330 includes wavelengths $\lambda_4$ and $\lambda_9$. Output light 340 includes wavelengths $\lambda_5$ and $\lambda_{10}$.

Diffraction grating 240 receives output lights 300, 310, 320, 330 and 340, and demultiplexes each output light into separated lights corresponding, respectively, to the wavelengths in the output light. For example, diffraction grating 240 demultiplexes output light 300 into three separate lights having wavelengths $\lambda_1$, $\lambda_6$ and $\lambda_{11}$, respectively.

If VIPA 230 disperses the output lights along a dispersion direction which is not parallel to the dispersion direction along which diffraction grating 240 disperses the separated lights, then the combination of VIPA 230 and diffraction grating 240 will allow a wavelength division multiplexed light having a relatively large number of closely spaced wavelength components to be accurately demultiplexed.

For example, FIG. 18 illustrates a grid 350 having points 1 through 12 arranged in a grid pattern. Points 1 through 12 represent the ends of individual fibers. If the dispersion direction of VIPA 240 is substantially perpendicular to the dispersion direction of diffraction grating 240, the separated lights produced by diffraction grating 240 can be received the by fibers arranged in the grid pattern. With this configuration, a wavelength division multiplexed light having a relatively large number of closely spaced wavelength components can be accurately demultiplexed.

It is not intended for the dispersion direction of VIPA 240 to be limited to being substantially perpendicular to the dispersion direction of diffraction grating 240. For example, the dispersion directions can simply be "not parallel" to each other. Moreover, the present invention is not intended to be limited by the relationship between the dispersion directions. Therefore, in some applications, it may be appropriate for the dispersion directions to be parallel.

It should be understood that a VIPA and a diffraction grating both output light at an output angle along a dispersion direction. Therefore, for example, VIPA 230 produces a plurality of output lights which are each dispersed from the VIPA at a different output angle. However, the output lights are dispersed along the same dispersion direction. In FIG. 18, the dispersion directions of VIPA 230 and diffraction grating 240 are preferably both substantially linear. For example, in FIG. 18, the dispersion direction of VIPA 230 can be vertical in relation to the figure, and the dispersion direction of diffraction grating 240 can be horizontal in relation to the figure. In this case, the dispersion directions would be perpendicular to each other.

The apparatus in FIG. 18 allows an input light in a broad wavelength range to be demultiplexed with great accuracy and high resolution. For example, if VIPA 230 demultiplexes twenty (20) wavelengths with 0.8 nm spacing within a 16 nm wavelength band, and diffraction grating 240 demultiplexes five (5) wavelengths in each VIPA wavelength band, 100 wavelengths with 0.08 nm spacing can be demultiplexed over a 80 nm total bandwidth.

In the above embodiments of the present invention, diffraction grating 240 is used as a demultiplexer. However, the present invention is not intended to be limited to use of a diffraction grating. Instead, any other suitable demultiplexer can be used. For example, an interference multi-layer film can be used.

According to the above embodiments of the present invention, an apparatus includes a VIPA and a demultiplexer, such as, for example, a diffraction grating. The VIPA receives an input light having a wavelength within a continuous range of wavelengths. In response, the VIPA produces a corresponding output light propagating away from the VIPA. The output light is dispersed from the VIPA along a substantially linear dispersion direction at a different output angle for each wavelength. Moreover, the dispersed output light includes a plurality of different wavelength components. The demultiplexer demultiplexes the output light into a plurality of separated lights corresponding, respectively, to the plurality of different wavelength components in the output light. The plurality of separated lights are dispersed by the demultiplexer along a substantially linear dispersion direction at a different output angle for each separated light. The dispersion direction of the VIPA is not parallel to, and is preferably perpendicular to, the dispersion direction of the demultiplexer. A lens can be provided which focuses the plurality of separated lights onto a focal plane, where each separated light is focused to a different point on the focal plane than the other separated lights.

Typically, the input light is a wavelength division multiplexed light including two or more lights which each are at a different wavelength. Then, the VIPA forms a respective output light for each light of the input light. Each output light is spatially distinguishable from the other output lights, and each output light includes a plurality of different wavelength components. In this case, the demultiplexer demultiplexes each output light into a plurality of separated lights corresponding, respectively, to the plurality of different wavelength components in the output light. A lens can then be provided which focuses the separated lights from the demultiplexer onto a focal plane. If the dispersion direction of the VIPA is substantially perpendicular to the dispersion direction of the demultiplexer, each separated light can be focused to a different point on the focal plane than the other separated lights so that the different points form a grid pattern on the focal plane.

According to embodiments of the present invention as illustrated, for example, in FIG. 18, an apparatus demultiplexes an input light that includes a plurality of lights which each are at a different wavelength. The apparatus includes first and second demultiplexers. For example, in FIG. 18, VIPA 230 acts as a first demultiplexer, and diffraction grating 240 acts as a second demultiplexer. The first demultiplexer demultiplexes the input light into a plurality of output lights corresponding, respectively, to the plurality of lights in the input light. The first demultiplexer disperses the plurality of output lights along a substantially linear dispersion direction at a different output angle for each output light. Moreover, each output light includes a plurality of wavelength components. The second demultiplexer demultiplexes each output light into a plurality of separated lights corresponding, respectively, to the plurality of wavelength components in the output light. The second demultiplexer disperses the plurality of separated lights along a substantially linear dispersion direction at a different output angle for each separated light. The dispersion direction of the second demultiplexer is not parallel to, and is preferably perpendicular to, the dispersion direction of the first demultiplexer. The first and second demultiplexers are not intended to be limited to a VIPA and a diffraction grating. Instead, any appropriate demultiplexers, or wavelength splitters, can be used.

Generally, a VIPA is an angular dispersive component having a passage area to receive light into, and to output light from, the VIPA. Through the passage area, the VIPA receives an input light having a respective wavelength within a continuous range of wavelengths. The VIPA causes multiple reflection of the input light to produce self-interference that forms the output light. The output light travels from the VIPA and is spatially distinguishable from an output light formed for an input light having any other wavelength within the continuous range of wavelengths.

Various lenses are disclosed herein. For example, FIG. 16(A) discloses the use of collimating lens 210, semi-cylindrical lens 220, and focusing lens 250. However, the present invention is not intended to be limited to the use of any specific type of lens. Instead, different types of lenses or devices can be used to provide an appropriate effect.

The term "plurality" is used herein to indicate "more than one". Therefore, a plurality of lights refers to "more than one" light. For example, two lights would be a plurality of lights.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
    a virtually imaged phased array (VIPA) generator receiving a line focused input light and producing a corresponding output light propagating away from the VIPA generator, the output light including a plurality of different wavelength components; and
    a demultiplexer demultiplexing the output light into a plurality of separated lights corresponding, respectively, to the plurality of different wavelength components in the output light.

2. An apparatus as in claim 1, wherein:
    the VIPA generator disperses the output light along a dispersion direction which is substantially linear,
    the demultiplexer disperses the separated lights along a dispersion direction which is substantially linear, and
    the dispersion direction of the VIPA generator is not parallel to the dispersion direction of the demultiplexer.

3. An apparatus as in claim 2, wherein the dispersion direction of the VIPA generator is perpendicular to the dispersion direction of the demultiplexer.

4. An apparatus as in claim 2, wherein the demultiplexer is a diffraction grating.

5. An apparatus as in claim 2, further comprising:
    a lens which focuses the plurality of separated lights onto a focal plane, each separated light being focused to a different point on the focal plane than the other separated lights.

6. An apparatus as in claim 1, wherein:

the input light is within a wavelength range which is divided into a plurality of wavelength bands determined by a free spectral range of the VIPA generator, and in each wavelength band, the VIPA generator has a higher resolution than the demultiplexer.

7. An apparatus as in claim 1, wherein:

the input light has a wavelength within a continuous range of wavelengths, as the wavelength of the input light changes along the continuous range of wavelengths, the VIPA generator disperses the output light along a substantially linear dispersion direction at a different output angle for each wavelength and the demultiplexer disperses the plurality of separated lights along a substantially linear dispersion direction at a different output angle for each separated light, the dispersion direction of the VIPA generator not being parallel to the dispersion direction of the demultiplexer.

8. An apparatus as in claim 7, wherein the dispersion direction of the VIPA generator is substantially perpendicular to the dispersion direction of the demultiplexer.

9. An apparatus as in claim 1, wherein:

the VIPA generator has a free spectral range, the wavelength of the input light is within a wavelength range which is divided into a plurality of wavelength bands determined by the free spectral range of the VIPA generator, for each wavelength band, as the wavelength of the input light changes within the wavelength band, the VIPA generator disperses the output light along a substantially linear dispersion direction at a different output angle for each wavelength, and the demultiplexer disperses the plurality of separated lights along a substantially linear dispersion direction at a different output angle for each separated light, the dispersion direction of the VIPA generator not being parallel to the dispersion direction of the demultiplexer.

10. An apparatus as in claim 1, wherein the demultiplexer is a diffraction grating.

11. An apparatus as in claim 1, wherein:

the VIPA generator is an angular dispersive component having a passage area to receive light into, and to output light from, the VIPA generator, the VIPA generator receives, through the passage area, the input light having a respective wavelength within a continuous range of wavelengths, and causes multiple reflection of the input light to produce self-interference that forms the output light travelling from the VIPA generator and which is spatially distinguishable from an output light formed for an input light having any other wavelength within the continuous range of wavelengths.

12. An apparatus as in claim 1, wherein:

the input light comprises at least two lights which each are at a different wavelength, and the VIPA generator forms a respective output light for each light of the input light, each output light being spatially distinguishable from the other output lights and each output light including a plurality of different wavelength components, and the demultiplexer demultiplexes each output light into a plurality of separated lights corresponding, respectively, to the plurality of different wavelength components in the output light.

13. An apparatus as in claim 12, further comprising:

a lens which focuses the separated lights from the demultiplexer onto a focal plane, each separated light being focused to a different point on the focal plane than the other separated lights so that the different points form a grid pattern on the focal plane.

14. An apparatus comprising:

a virtually imaged phased array (VIPA) generator receiving an input light having a wavelength within a continuous range of wavelengths and producing a corresponding output light propagating away from the VIPA generator, the output light being dispersed from the VIPA generator along a substantially linear dispersion direction at a different output angle for each wavelength, the dispersed output light including a plurality of different wavelength components; and a demultiplexer demultiplexing the output light into a plurality of separated lights corresponding, respectively, to the plurality of different wavelength components in the output light, the plurality of separated lights being dispersed by the demultiplexer along a substantially linear dispersion direction at a different output angle for each separated light, the dispersion direction of the VIPA generator not being parallel to the dispersion direction of the demultiplexer.

15. An apparatus as in claim 14, further comprising:

a lens which focuses the plurality of separated lights onto a focal plane, each separated light being focused to a different point on the focal plane than the other separated lights.

16. An apparatus as in claim 14, wherein:

the input light comprises at least two lights which each are at a different wavelength, and the VIPA generator forms a respective output light for each light of the input light, each output light being spatially distinguishable from the other output lights and each output light including a plurality of different wavelength components, and the demultiplexer demultiplexes each output light into a plurality of separated lights corresponding, respectively, to the plurality of different wavelength components in the output light.

17. An apparatus as in claim 16, further comprising:

a lens which focuses the separated lights from the demultiplexer onto a focal plane, each separated light being focused to a different point on the focal plane than the other separated lights so that the different points form a grid pattern on the focal plane.

18. An apparatus as in claim 14, wherein:

the VIPA generator is an angular dispersive component having a passage area to receive light into, and to output light from, the VIPA generator, the VIPA generator receives, through the passage area, the input light having a respective wavelength within a continuous range of wavelengths, and causes multiple reflection of the input light to produce self-interference that forms the output light travelling from the VIPA generator and which is spatially distinguishable from an output light formed for an input light having any other wavelength within the continuous range of wavelengths.

19. An apparatus comprising:

an angular dispersive component having a passage area to receive light into, and to output light from, the angular dispersive component, the angular dispersive component receiving, through the passage area, an input light having a respective wavelength within a continuous range of wavelengths, and causing multiple reflection of the input light to produce self-interference that forms an output light travelling from the angular dispersive component and which is spatially distinguishable from an output light formed for an input light having any other wavelength within the continuous range of wavelengths, the output light being dispersed from the angular dispersive component along a substantially linear dispersion direction at a different output angle for each wavelength, the dispersed output light including a plurality of different wavelength components;

a demultiplexer demultiplexing the output light into a plurality of separated lights corresponding, respectively, to the plurality of different wavelength components in the output light, the plurality of separated lights being dispersed by the demultiplexer along a substantially linear dispersion direction at a different output angle for each separated light, the dispersion direction of the angular dispersive component not being parallel to the dispersion direction of the demultiplexer; and a lens which focuses the plurality of separated lights onto a focal plane, each separated light being focused to a different point on the focal plane than the other separated lights.

20. An apparatus as in claim 19, wherein the demultiplexer is a diffraction grating.

21. An apparatus as in claim 19, wherein:

the input light comprises at least two lights which each are at a different wavelength, and the angular dispersive component forms a respective output light for each light of the input light, each output light being spatially distinguishable from the other output lights and each output light including a plurality of different wavelength components, the demultiplexer demultiplexes each output light into a plurality of separated lights corresponding, respectively, to the plurality of different wavelength components in the output light; and the lens focuses each separated light to a different point on the focal plane than the other separated lights so that the different points form a grid pattern on the focal plane.

22. An apparatus for demultiplexing an input light that includes a plurality of lights which each are at a different wavelength, the apparatus comprising:

a first demultiplexer which receives the input light focused into a line, and demultiplexes the line focused input light into a plurality of output lights corresponding, respectively, to the plurality of lights in the input light, the first demultiplexer dispersing the plurality of output lights along a substantially linear dispersion direction at a different output angle for each output light, each output light including a plurality of wavelength components; and a second demultiplexer which demultiplexes each output light into a plurality of separated lights corresponding, respectively, to the plurality of wavelength components in the output light, the second demultiplexer dispersing the plurality of separated lights along a substantially linear dispersion direction at a different output angle for each separated light, the dispersion direction of the second demultiplexer not being parallel to the dispersion direction of the first demultiplexer.

23. An apparatus as in claim 22, wherein the dispersion direction of the second demultiplexer is perpendicular to the dispersion direction of the first demultiplexer.

24. An apparatus as in claim 22, wherein the first demultiplexer is a virtually imaged phased array (VIPA) generator.

25. An apparatus as in claim 22, wherein the second demultiplexer is a diffraction grating.

26. An apparatus as in claim 24, wherein the second demultiplexer is a diffraction grating.

27. An apparatus as in claim 22, wherein:

the first demultiplexer has a corresponding free spectral range;

the input light is within a wavelength range which is divided into a plurality of wavelength bands determined by the free spectral range of the first demultiplexer, and in each wavelength band, the first demultiplexer has a higher resolution than the second demultiplexer.

28. An apparatus as in claim 22, further comprising:

a lens which focuses the separated lights from the second demultiplexer onto a focal plane, each separated light being focused to a different point on the focal plane than the other separated lights so that the different points form a grid pattern on the focal plane.

29. An apparatus comprising:

a virtually imaged phased array (VIPA) generator receiving an input light and producing a corresponding output light propagating away from the VIPA generator, the output light including a plurality of different wavelength components; and a demultiplexer demultiplexing the output light into a plurality of separated lights corresponding, respectively, to the plurality of different wavelength components in the output light, wherein the VIPA generator disperses the output light along a dispersion direction which is substantially linear, the demultiplexer disperses the separated lights along a dispersion direction which is substantially linear, and the dispersion direction of the VIPA generator is not parallel to the dispersion direction of the demultiplexer.

30. An apparatus as in claim 29, wherein the dispersion direction of the VIPA generator is perpendicular to the dispersion direction of the demultiplexer.

31. An apparatus comprising:

a virtually imaged phased array (VIPA) generator receiving an input light and producing a corresponding output light propagating away from the VIPA generator, the output light including a plurality of different wavelength components; and a demultiplexer demultiplexing the output light into a plurality of separated lights corresponding, respectively, to the plurality of different wavelength components in the output light, wherein the input light has a wavelength within a continuous range of wavelengths, as the wavelength of the input light changes along the continuous range of wavelengths, the VIPA generator disperses the output light along a substantially linear dispersion direction at a different output angle for each wavelength and the demultiplexer disperses the plurality of separated lights along a substantially linear dispersion direction at a different output angle for each separated light, the dispersion direction of the VIPA generator not being parallel to the dispersion direction of the demultiplexer.

32. An apparatus as in claim 31, wherein the dispersion direction of the VIPA generator is substantially perpendicular to the dispersion direction of the demultiplexer.

33. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein
the VIPA generator has a free spectral range,
the wavelength of the input light is within a wavelength range which is divided into a plurality of wavelength bands determined by the free spectral range of the VIPA generator,
for each wavelength band, as the wavelength of the input light changes within the wavelength band,
the VIPA generator disperses the output light along a substantially linear dispersion direction at a different output angle for each wavelength, and
the demultiplexer disperses the plurality of separated lights along a substantially linear dispersion direction at a different output angle for each separated light, the dispersion direction of the VIPA generator not being parallel to the dispersion direction of the demultiplexer.

34. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein the demultiplexer is a diffraction grating.

35. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein
the VIPA generator disperses the output light along a dispersion direction which is substantially linear,
the demultiplexer disperses the separated lights along a dispersion direction which is substantially linear,
the dispersion direction of the VIPA generator is not parallel to the dispersion direction of the demultiplexer, and
the demultiplexer is a diffraction grating.

36. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein
the VIPA generator is an angular dispersive component having a passage area to receive light into, and to output light from, the VIPA generator, and
the VIPA generator receives, through the passage area, the input light having a respective wavelength within a continuous range of wavelengths, and causes multiple reflection of the input light to produce self-interference that forms the output light travelling from the VIPA generator and which is spatially distinguishable from an output light formed for an input light having any other wavelength within the continuous range of wavelengths.

37. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein
the VIPA generator disperses the output light along a dispersion direction which is substantially linear,
the demultiplexer disperses the separated lights along a dispersion direction which is substantially linear,
the dispersion direction of the VIPA generator is not parallel to the dispersion direction of the demultiplexer, and
the apparatus further comprises a lens which focuses the plurality of separated lights onto a focal plane, each separated light being focused to a different point on the focal plane than the other separated lights.

38. An apparatus comprising:
a virtually imaged phased array (VIPA) generator receiving an input light and producing a corresponding output light propagating away from the VIPA generator, the output light including a plurality of different wavelength components; and
a demultiplexer demultiplexing the output light into a plurality of separated lights corresponding, respectively, to the plurality of different wavelength components in the output light, wherein
the input light comprises at least two lights which each are at a different wavelength, and the VIPA generator forms a respective output light for each light of the input light, each output light being spatially distinguishable from the other output lights and each output light including a plurality of different wavelength components,
the demultiplexer demultiplexes each output light into a plurality of separated lights corresponding, respectively, to the plurality of different wavelength components in the output light, and
the apparatus further comprises a lens which focuses the separated lights from the demultiplexer onto a focal plane, each separated light being focused to a different point on the focal plane than the other separated lights so that the different points form a grid pattern on the focal plane.

39. An apparatus comprising:
angular dispersive component including first and second reflecting surfaces, the second reflecting surface having a reflectivity which causes a portion of light incident thereon to be transmitted therethrough, an input light at a respective wavelength being focused into a line and the first and second reflecting surfaces being positioned so that the input light radiates from the line to be reflected a plurality of times between the first and second reflecting surfaces and thereby cause a plurality of lights to be transmitted through the second reflecting surface, the plurality of transmitted lights interfering with each other to produce an output light which is spatially distinguishable from an output light produced for an input light at a different wavelength, the output light including a plurality of different wavelength components; and a demultiplexer demultiplexing the output light into a plurality of separated lights corresponding, respectively, to the plurality of different wavelength components in the output light.

40. An apparatus as in claim 39, further comprising:

a lens which focuses the plurality of separated lights onto a focal plane, each separated light being focused to a different point on the focal plane than the other separated lights.

41. An apparatus as in claim 39, wherein:

the input light comprises at least two lights which each are at a different wavelength, and the angular dispersive component forms a respective output light for each light of the input light, each output light being spatially distinguishable from the other output lights and each output light including a plurality of different wavelength components, and the demultiplexer demultiplexes each output light into a plurality of separated lights corresponding, respectively, to the plurality of different wavelength components in the output light.

42. An apparatus as in claim 41, further comprising:

a lens which focuses the separated lights from the demultiplexer onto a focal plane, each separated light being focused to a different point on the focal plane than the other separated lights so that the different points form a grid pattern on the focal plane.

43. An apparatus as in claim 39, wherein:

the angular dispersive component disperses the output light along a dispersion direction which is substantially linear, the demultiplexer disperses the separated lights along a dispersion direction which is substantially linear, and the dispersion direction of the angular dispersive component is not parallel to the dispersion direction of the demultiplexer.

44. An apparatus as in claim 43, wherein the dispersion direction of the angular dispersive component is perpendicular to the dispersion direction of the demultiplexer.

* * * * *